United States Patent
Zhu

(10) Patent No.: US 10,405,330 B2
(45) Date of Patent: Sep. 3, 2019

(54) SYSTEM AND METHOD FOR DYNAMIC MARKING FOR INTERNET PROTOCOL BEARER SPLITTING

(71) Applicant: Intel Corporation, Santa Clara, CA (US)

(72) Inventor: Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/568,768

(22) PCT Filed: Apr. 15, 2016

(86) PCT No.: PCT/US2016/027958
§ 371 (c)(1),
(2) Date: Oct. 23, 2017

(87) PCT Pub. No.: WO2016/200487
PCT Pub. Date: Dec. 15, 2016

(65) Prior Publication Data
US 2018/0146487 A1 May 24, 2018

Related U.S. Application Data

(60) Provisional application No. 62/173,225, filed on Jun. 9, 2015.

(51) Int. Cl.
| | | |
|---|---|---|
| *H04W 72/12* | (2009.01) | |
| *H04W 28/12* | (2009.01) | |
| *H04W 28/02* | (2009.01) | |
| *H04L 12/851* | (2013.01) | |

(Continued)

(52) U.S. Cl.
CPC ..... *H04W 72/1205* (2013.01); *H04L 47/2408* (2013.01); *H04W 28/0263* (2013.01);
(Continued)

(58) Field of Classification Search
CPC ............. H04W 72/1205; H04W 28/12; H04W 28/0263; H04W 28/08; H04L 47/2408; H04L 69/22; H04L 47/34
See application file for complete search history.

(56) References Cited

U.S. PATENT DOCUMENTS

| | | | |
|---|---|---|---|
| 2010/0067400 A1* | 3/2010 | Dolganow | H04W 72/1236 370/253 |
| 2011/0035495 A1* | 2/2011 | Ekstrom | H04L 47/10 709/225 |

(Continued)

FOREIGN PATENT DOCUMENTS

| | | |
|---|---|---|
| WO | 2007079773 A1 | 7/2007 |
| WO | 2014200859 A1 | 12/2014 |

OTHER PUBLICATIONS

International Search Report and Written Opinion dated Jul. 20, 2016, from International Application No. PCT/US2016/027958, 17 pages.

*Primary Examiner* — Shailendra Kumar
(74) *Attorney, Agent, or Firm* — Schwabe, Williamson & Wyatt, P.C.

(57) ABSTRACT

A User Equipment (UE), an evolved Node B (eNB), or a PDN Gateway (PGW) comprising a processing circuitry to comprise a user-plane multi-link data convergence element for modifying the IP header of a data packet to support transporting an EPS bearer over multiple radio (3GPP or Non-3GPP) access networks simultaneously, bearer splitting. The eNB or PGW may be configured to send a message to UE, requesting the candidate bits to be reused to support bearer splitting. The UE to be configured to send a message to eNB or PGW, indicating which bits of the IP header field (e.g. ToS, TTL). The eNB or PGW is configured to send a message to UE, confirming which bits of the internet protocol (IP) header field will be used, and a mapping rule (Continued)

between the bit value and the various bearer splitting mode that a data packet to be subject to. The eNB or PGW or UE to be configured to monitor incoming IP packets, and stop marking if default values of selected bits in the incoming IP packets have changed. The eNB or PGW or UE to send a message to notify the other side that the marking has stopped due to the change of the default, and the message may also include the sequence number of the last marked data packet. An IP header field of the data packet to comprise to be a Type of Service (ToS) field or a Time to Live (TTL) field.

19 Claims, 8 Drawing Sheets

(51) Int. Cl.
    *H04W 28/08*      (2009.01)
    *H04L 12/801*      (2013.01)
    *H04L 29/06*      (2006.01)

(52) U.S. Cl.
    CPC ............ *H04W 28/12* (2013.01); *H04L 47/34* (2013.01); *H04L 69/22* (2013.01); *H04W 28/08* (2013.01)

(56) References Cited

U.S. PATENT DOCUMENTS

| | | | |
|---|---|---|---|
| 2014/0362699 A1* | 12/2014 | Kanamarlapudi | H04L 47/34 370/235 |
| 2015/0098326 A1* | 4/2015 | Ludwig | B60R 19/04 370/230 |

* cited by examiner

SYSTEM AND METHOD FOR DYNAMIC MARKING FOR INTERNET PROTOCOL BEARER SPLITTING

CROSS REFERENCE TO RELATED APPLICATIONS

The present application is a national phase entry under 35 U.S.C. § 371 of International Application No. PCT/US2016/027958, filed Apr. 15, 2016, entitled "SYSTEM AND METHOD FOR DYNAMIC MARKING FOR INTERNET PROTOCOL BEARER SPLITTING", which designates the United States of America, which claims priority to U.S. Provisional Patent Application No. 62/173,225, filed on Jun. 9, 2015, entitled "METHODS TO SUPPORT DYNAMIC IP HEADER MARKING FOR ABOVE PDCP BEARER SPLITTING IN INTEGRATED WLAN/3GPP NETWORK,"; the entire specifications of which are hereby incorporated by reference in their entireties for all purposes, except for those sections, if any, that are inconsistent with this specification.

BACKGROUND

Wireless mobile communication technology may use various standards and protocols to provide telecommunication services to one or more fixed or mobile subscribers, e.g., a base station and a wireless mobile device. In the third generation partnership project (3GPP) long term evolution (LTE) systems, a base station may be an evolved or enhanced Node Bs (eNode Bs or eNBs) that may communicate with the wireless mobile device, known as a user equipment (UE). A wireless communication device, e.g., a mobile device, may be configured to utilize multiple wireless communication technologies. For example, a UE may be configured to utilize a cellular connection, e.g., a Long Term Evolution (LTE) cellular connection, as well as other connections such as a wireless-local-area-network (WLAN) connection, e.g., a Wireless-Fidelity (WiFi) connection.

BRIEF DESCRIPTION OF THE DRAWINGS

The disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
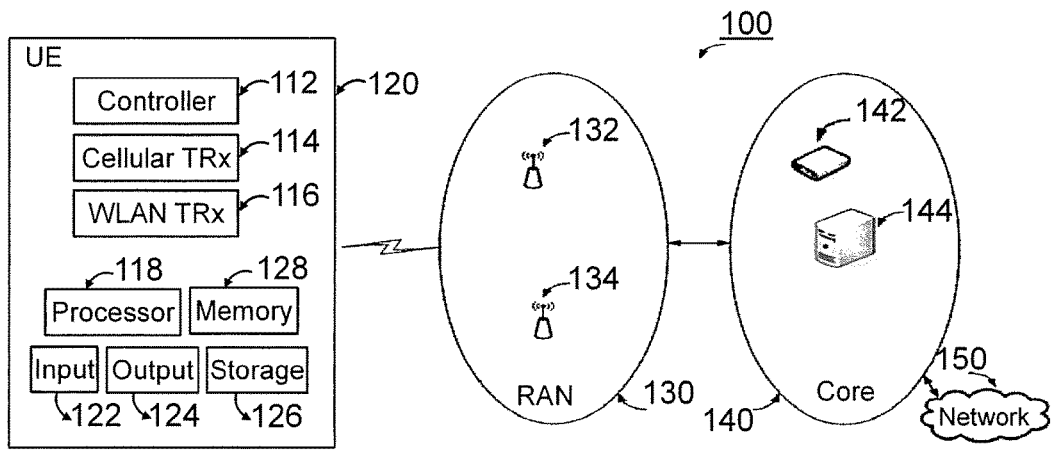
FIG. 1 is a schematic block diagram illustration of an example of a wireless radio access network, in accordance with some demonstrative embodiments.

Reference will now be made to the exemplary embodiments illustrated, and specific language will be used herein to describe the same. It will nevertheless be understood that no limitation of the scope of the disclosure is thereby intended.

DETAILED DESCRIPTION

Before the present disclosure is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device, a mobile device, a smartphone, etc.). For example, a non-transitory machine-readable medium may include read only memory (ROM); random access memory (RAM); magnetic disk storage media; optical storage media; flash memory devices. For another example, a machine-readable medium may include electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting. As used herein, the term "module" and/or "unit" may refer to, be part of, or include an Application Specific Integrated Circuit (ASIC), an electronic circuit, a processor (shared, dedicated, or group) and/or memory (shared, dedicated, or group) that may execute one or more software or firmware programs, a combinational logic circuit, and/or other suitable components that provide the described functionality.

Further, various operations will be described as multiple discrete operations, in turn, in a manner that is helpful in understanding the illustrative embodiments; however, the order of description should not be construed as to imply that these operations are necessarily order dependent. In particular, these operations may not need to be performed in the order of presentation.

An initial overview of technology embodiments may be provided below and then technology embodiments are described in further detail later. This initial summary is intended to aid readers in understanding the technology more quickly but is not intended to identify key features or essential features of the technology nor is it intended to limit the scope of the claimed subject matter. The following embodiments may be used in a variety of applications including transmitters and receivers of a radio system, although the present disclosure is not limited in this respect. Examples of radio systems may include, but are not limited to, network interface cards (NICs), network adaptors, fixed or mobile client devices, relays, base stations, femtocells, gateways, bridges, hubs, routers, access points, or other network devices. Further, the radio systems within the scope of the disclosure may be implemented in cellular radiotelephone systems, satellite systems, two-way radio systems as well as computing devices including such radio systems, e.g., personal computers, tablets and related peripherals, personal digital assistants, personal computing accessories, hand-held communication devices and all systems which may be related in nature and to which the principles of the inventive embodiments could be suitably applied.

In third generation partnership project (3GPP) radio access network (RAN) long term evolution (LTE) system, a transmission station may comprise an evolved universal terrestrial radio access network (E-UTRAN) Node B (also commonly denoted as evolved Node B, enhanced Node B, eNodeB, or eNB), which may communicate with a wireless mobile device, known as a user equipment (UE). A downlink transmission may comprise a communication from the transmission station (or eNodeB) to the wireless mobile device (or UE), and an uplink transmission may comprise a communication from the wireless mobile device to the transmission station.

Some embodiments may be used in conjunction with various devices and/or systems, for example, a UE, a mobile device, a mobile wireless device, a mobile communication device, a wireless station, a mobile station, a personal computer, a desktop computer, a mobile computer, a laptop computer, a netbook computer, a notebook computer, a tablet computer, a smartphone device, a mobile phone, a cellular phone, a server computer, a handheld computer, a handheld mobile device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless communication system, a wireless access point (AP), a wireless node, a base station (BS), a wired or wireless router, a wired or wireless modem, a video device, an audio device, an audio-video (AN) device, a wired or wireless network, a wireless area network, a cellular network, a cellular node, a cellular device, a wireless local area network (WLAN) device, an universal integrated circuit card (UICC), an ultra mobile PC (UMPC), a customer premise equipment (CPE), a multiple input multiple output (MIMO) transceiver or device, a device having one or more internal antennas and/or external antennas, a digital video broadcast (DVB) device, a multi-standard radio device, a wired or wireless handheld device, a wireless application protocol (WAP) device, vending machines, sell terminals, a wearable device, a handset, and/or other consumer electronics such as MP3 players, digital cameras and the like, personal computing accessories and existing and future arising wireless mobile devices which may be related in nature and to which the principles of the embodiments could be suitably applied.

Some demonstrative embodiments may be described herein with respect to a LTE network. However, other embodiments may be implemented in any other suitable cellular network or system, e.g., a GSM network, a 3G cellular network such as a Universal Mobile Telecommunications System (UMTS) cellular system, a 4G cellular network, a 4.5G network, a 5G network, a WiMax cellular network, or the like or other future network.

Some demonstrative embodiments may be described herein with respect to a WLAN system or network. However, other embodiments may be implemented in any other suitable non-cellular network.

FIG. 1 schematically illustrates a block diagram of a wireless radio access network 100, in accordance with some demonstrative embodiments. As shown in FIG. 1, in some demonstrative embodiments, network 100 may include one or more wireless communication devices capable of communicating content, data, information and/or signals via one or more wireless mediums, for example, a radio channel, a cellular channel, an RF channel, a Wireless Fidelity (WiFi) channel, an IR channel, and the like, e.g., as described below. One or more elements of network 100 may optionally be capable of communicating over any suitable wired communication links. In accordance with some demonstrative embodiments, network 100 may be a broadband wireless access (BWA) network. Network 100 may comprise one or more radio access networks (RANs) 130 and/or a core network 140.

In some demonstrative embodiments, network 100 may include a UE 120 that may access the core network 140 via a radio link with a base station (e.g., eNBs 132 or 134, or other cellular nodes) in the RAN 130. For example, eNBs 132, 134 may each comprise one or more antennas, one or more radio modules to modulate and/or demodulate signals transmitted or received on an air interface, and one or more digital modules to process signals transmitted and received on the air interface. UE 120 may be a subscriber station that may be configured to support multiple-input and multiple-output (MIMO) communication with the eNB 132 and/or 134.

In some demonstrative embodiments, one or more nodes 142 may be used to facilitate communication with the UE 120 via RAN 130 and/or core network 140. In some embodiments, the one or more nodes 142 may include, e.g., a mobile management entity (MME), a packet data network (PDN) gateway (P-GW) and/or a serving gateway (S-GW), as described below. While FIG. 1 illustrates an embodiment of UE 120 that may be outside RAN 130, in some embodiments, UE 120 may be part of RAN 130.

In some embodiments, UE 120 may communicate with one or more networks 150 via RAN 130 and/or core network 140. In some demonstrative embodiments, networks 150 may include one or more packet data networks (PDNs). For example, networks 150 may include an Internet network, an IP multimedia core network subsystem (IMS) network, and/or any other PDN. In other embodiments, networks 150 may include any other suitable additional and/or alternative network. For example, network 150 may comprise a non-cellular network, for example, a WLAN, e.g., a Basic Service Set (BSS), that may be managed by a WLAN access point.

In some demonstrative embodiments, eNB 132, 134 may be configured to perform one or more of radio resource management (RRM), radio bearer control, radio admission control (access control), connection mobility management, resource scheduling between UEs and eNB radios.

In some demonstrative embodiments, the core network (CN or CNW) 140 may be configured to provide one or more services to UE 120, and/or to setup and/or manage communication between UE 120 and RAN 130 and/or networks 150. In some demonstrative embodiments, the CN 140 may comprise one or more servers 144 that may be communicatively coupled to the one or more eNBs 132, 134. The one or more servers 144 may each comprise a home subscriber server (HSS) that may be used to manage user parameters such as a user's international mobile subscriber identity (IMSI), authentication information, and the like. The one or more servers 144 may include over-the-air (OTA) servers in some embodiments. In some embodiments, logic associated with different functionalities of the one or more servers 144 may be combined to reduce a number of servers, including, e.g., combined in a single machine or module.

In some demonstrative embodiments, CN 140 may comprise one or more PDN Gateways (P-GWs) to support a PDN connection between UE 120 and a PDN of network 150. In some demonstrative embodiments, CN 140 may comprise a mobility manager (e.g., MME) to manage one or more mobility-related aspects of a mobility of UE 120 between radio access technology (RAT) networks.

In some demonstrative embodiments, UE 120 may comprise, for example, a mobile computer, a mobile device, a station, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., cellular phone functionalities combined with PDA device functionalities), a consumer device, a vehicular device, a non-vehicular device, a mobile or portable device, a mobile phone, a cellular telephone, a personal communication system (PCS) device, a mobile or portable global positioning system (GPS) device, a digital video broadcast (DVB) device, a relatively small computing device, a non-desktop computer, a "carry small live large" (CSLL) device, a wearable device, an ultra mobile device (UMD), an ultra mobile PC (UMPC), a mobile internet device (MID), an "Origami" device or computing device, a video device, an audio device, an A/V device, a gaming device, a media player, a smartphone, a mobile phone or any other or the like.

In some demonstrative embodiments, UE 120 and/or eNB 132 or 134 may include one or more wireless communication units to perform wireless communication between UE 120, RAN 130 and/or with one or more other wireless communication devices.

In some demonstrative embodiments, UE 120 may include a cellular Transceiver (TRx) 114 to communicate with RAN 130, and a WLAN TRx 116 to communicate with WLAN 150, e.g., via a WLAN access point. In some embodiments, WLAN 150 may be part of RAN 130.

In some demonstrative embodiments, cellular TRx 114 and/or WLAN TRx 116 may include, or may be associated with, one or more antennas. In one example, UE 120 may include one or more antennas (not shown) or any number of antennas. In some embodiments, antennas of UE 120 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, antennas of UE 120 may include any type of antennas suitable for transmitting and/or receiving wireless communication signals, blocks, frames, transmission streams, packets, messages and/or data. For example, antennas of UE 120 may include any suitable configuration, structure and/or arrangement of one or more antenna elements, components, units, assemblies and/or arrays. For example, antennas of UE 120 may include a phased array antenna, a dipole antenna, a single element antenna, a set of switched beam antennas, and/or the like.

In some demonstrative embodiments, cellular TRx 114 and/or WLAN TRx 116 may include one or more wireless transmitters, receivers and/or transceivers, transceiver circuitry that may be able to send and/or receive wireless communication signals, RF signals, frames, blocks, transmission streams, packets, messages, data items, and/or data.

In some demonstrative embodiments, WLAN TRx 116 may be configured to communicate with the WLAN access point over a WLAN link, and cellular transceiver 114 may be configured to communicate with RAN 130 over a cellular link.

In some demonstrative embodiments, the WLAN link may include, for example, a Wireless Fidelity (WiFi) link, a Wireless Gigabit (WiGig) link, or any other link. In some demonstrative embodiments, the WLAN link may include a link over, e.g., 2.4 Gigahertz (GHz) or 5 GHz frequency band, 60 GHz frequency band, or any other frequency band.

In some demonstrative embodiments, cellular TRx 114 may include a multiple input multiple output (MIMO) transmitters receivers system (not shown), which may be capable of performing antenna beamforming methods. In other embodiments, cellular TRx 114 may include any other transmitters and/or receivers.

In some demonstrative embodiments, cellular TRx 114 may include a turbo decoder and/or a turbo encoder (not shown) for encoding and/or decoding data bits into data symbols, if desired. In other embodiments, cellular TRx 114 may include any other encoder and/or decoder.

In some demonstrative embodiments, cellular TRx 114 may include OFDM and/or SC-FDMA modulators and/or demodulators (not shown) configured to communicate OFDM signals and/or SC-FDMA signals between UE 120 and RAN 130. In other embodiments, cellular TRx 114 may include any other modulators and/or demodulators.

In some demonstrative embodiments, WLAN TRx 116 may establish a WLAN link with an AP. For example, WLAN TRx 116 may perform the functionality of one or more stations, e.g., one or more WiFi stations, WLAN stations, and/or millimeter Wave (mmWave) stations. The WLAN link may include an uplink and/or a downlink.

In some demonstrative embodiments, UE 120 may include, for example, one or more of a processor 118, an input unit 122, an output unit 124, a memory 128, and a storage 126. UE 120 may include other suitable hardware components, software and/or firmware components. In some demonstrative embodiments, some or all of the components of UE 120 may be enclosed in a common device, and may be interconnected or operably associated using one or more wired or wireless links.

In some demonstrative embodiments, processor 118 may include, for example, a central processing unit (CPU), a digital signal processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an integrated circuit (IC), an application-specific IC (ASIC), a controller, controller circuitry, scheduler circuitry, processor circuitry, memory circuitry or any other suitable multi-purpose or specific processor or controller. Processor 118 may execute one or more instructions, for example, of an operating system (OS) of UE 120 and/or of one or more suitable applications or software/firmware.

Input unit 122 may include, for example, a keyboard, a keypad, a mouse, a touch-screen, a touch-pad, a track-ball, a stylus, a microphone, or any other suitable pointing device or input device. Output unit 124 includes, for example, a monitor, a screen, a touch-screen, a flat panel display, a cathode ray tube (CRT) display unit, a liquid crystal display (LCD) display unit, a plasma display unit, one or more audio speakers or earphones, or any other suitable output devices.

Memory 128 may load and/or store, e.g., data, information, and/or instruction, or the like. In various embodiments, memory 128 may comprise any combination of one or more suitable volatile memories (e.g., dynamic random access memory (DRAM)) and/or non-volatile memory (e.g., flash memory). Examples of memory may comprise a random access memory (RAM), a read only memory (ROM), a dynamic RAM (DRAM), a synchronous DRAM (SD-RAM), a flash memory, a volatile memory, a non-volatile memory, a cache memory, a buffer, a short term memory, a long term memory, or other suitable memories. Examples of storage 86 may comprise a hard disk drive, a floppy disk drive, a Compact Disk (CD) drive, a CD-ROM drive, a DVD drive, or other suitable removable or non-removable storages.

In some demonstrative embodiments, UE 120 may be configured to utilize a cellular connection, e.g., a Long Term Evolution (LTE) cellular connection, a Universal Mobile Telecommunications System (UMTS) connection or any other cellular connection, to communicate with RAN 130, and a WLAN connection, e.g., a Wireless-Fidelity (WiFi) connection or any other WLAN connection, to communicate with an AP.

In some demonstrative embodiments, cellular TRx 114 may utilize the cellular link between UE 120 and RAN 130 to communicate traffic of one or more PDN connections, e.g., via one or more P-GWs.

In some demonstrative embodiments, UE 120 may establish one or more bearers, e.g., one or more Evolved Packet-switched System (EPS) bearers, via the one or more PDN connections between UE 120 and one or more PGWs.

In some demonstrative embodiments, one or more elements of network 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to respond to rapid changes in customer demand, reduce power consumption, reduce cost, increase efficiency and/or achieve any other benefit.

In one example, network 100 may utilize a multi-tier, multi-radio access technology (Multi-RAT) architecture, including a tier of small cells, e.g., pico, femto, relay stations, WiFi APs, and the like, overlaid on top of a macro cellular deployment to augment network capacity. In another example, network 100 may utilize multi-RAT small cells integrating multiple radios such as WiFi and 3GPP air interfaces in a single infrastructure device. In other embodiments, network 100 may implement any other architecture and/or deployment.

In some demonstrative embodiments, network 100 may be configured to enable selective connection of UE 120 to the WLAN or the cellular network. In some demonstrative embodiments, UE 120 may include a controller 112 to control one or more functionalities of UE 120 and/or to control one or more communications performed by UE, for example, with WLAN 150 and RAN 130.

In some demonstrative embodiments, controller 112 may include or may be implemented using suitable circuitry, e.g., controller circuitry, scheduler circuitry, processor circuitry, memory circuitry, and/or any other circuitry, which may be configured to perform at least part of the functionality of controller 112. In some embodiments, one or more functionalities of controller 112 may be implemented by logic, which may be executed by a machine and/or one or more processors.

Figure 2A:
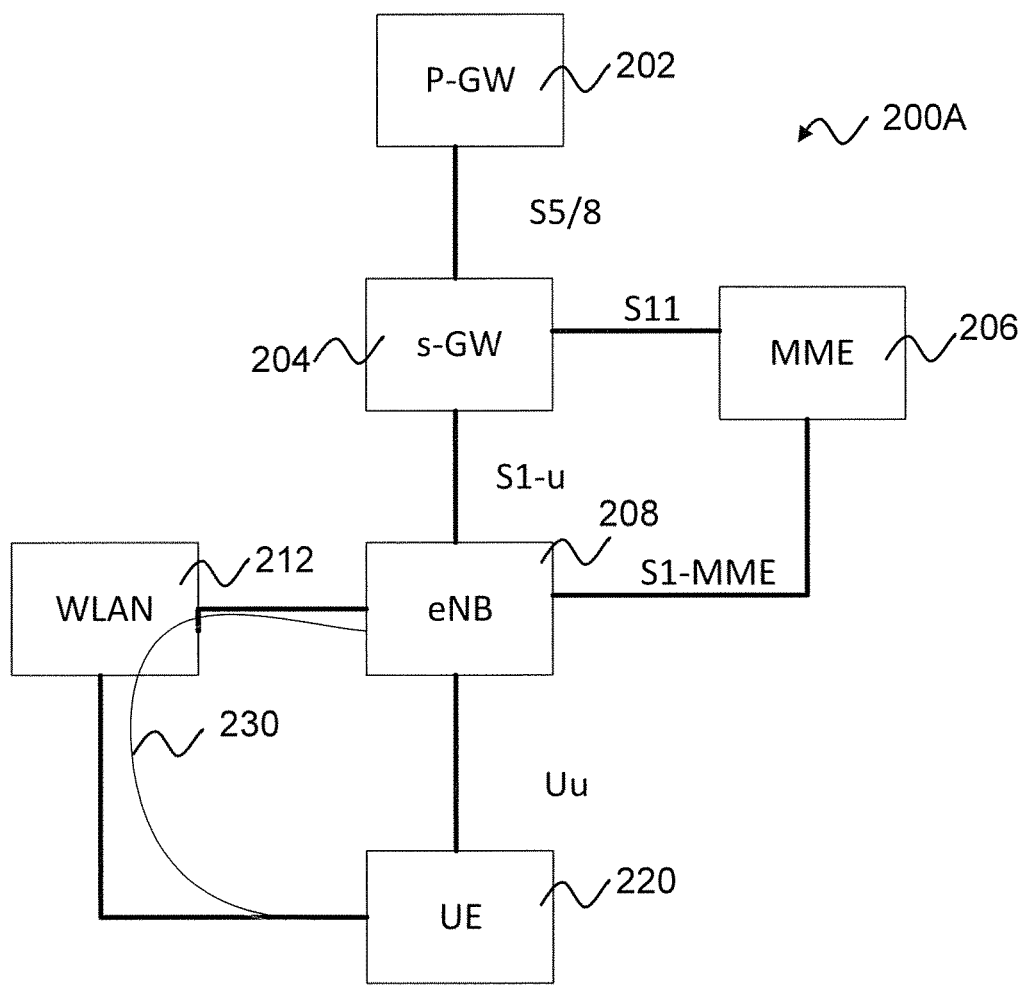
FIG. 2A is a schematic illustration of an example of an integrated network architecture, in accordance with some demonstrative embodiments.
Figure 2B:
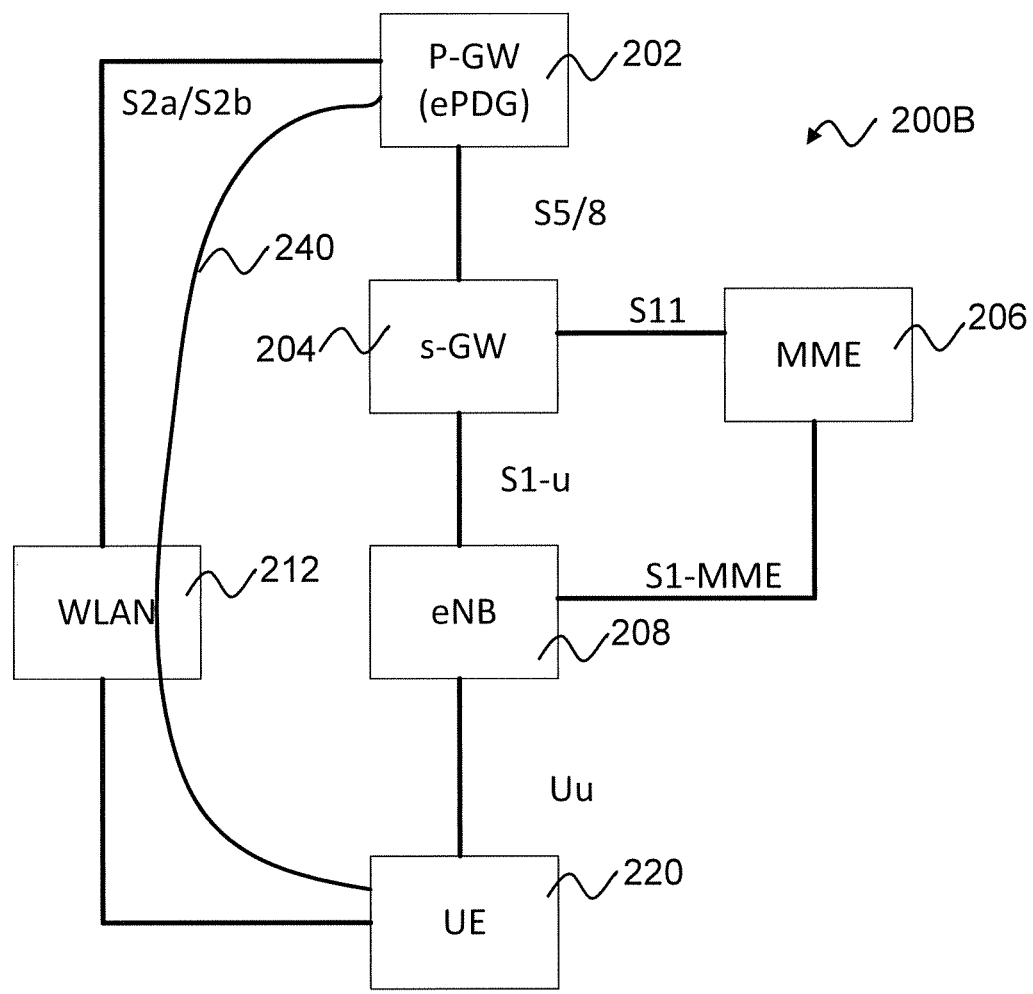
FIG. 2B is a schematic illustration of an example of an integrated network architecture, in accordance with some demonstrative embodiments.

FIGS. 2A and 2B demonstratively illustrates examples of an integrated network architecture, in accordance with some demonstrative embodiments. In some demonstrative embodiments, the end to end (E2E) network architectures 200A and 200B may support WLAN/3GPP link or multi-link aggregation in, e.g., 3GPP Release 13. In some embodiments, architectures 200A and 200B may support RAN based link aggregation, e.g., with link 230 or core based link aggregation 240, e.g., with link 240, respectively. In some embodiments, the RAN based link aggregation and the core based aggregation may be different based on where the mobility anchor is located.

For example, in a RAN based architecture, e.g., 200A, the mobility anchor may be at eNB 208. The WLAN/3GPP link or multi-link aggregation may be transparent to 3GPP core network elements, e.g. MME 206, serving gateway (S-GW) 204, and/or PDN gateway (P-GW) 202. In a core based architecture 200B, mobility anchor may be at P-GW that may be a user plane anchor for mobility between 3GPP access and non-3GPP access. In the architecture 200B, the WLAN/3GPP link or multi-link aggregation may be managed via, e.g., explicit message exchange among UE 220, eNB 208, MME 206, S-GW 204, and/or P-GW 202.

In some demonstrative embodiment, MME 206 may be configured to manage one or more mobility-related aspects of a mobility of UE 220 between Radio Access Technology (RAT) networks, e.g., a cellular network, e.g., LTE network, and a non-cellular network, e.g., WLAN network and/or manage signaling exchanges between eNB 208 and the core network.

In some embodiments, MME 206 may comprise one or more interfaces to interface between MME 206 and one or more other elements of a network. For example, MME 206 may comprise an eNB interface to communicate with eNB 208. An eNB interface may comprise an S1-MME interface to communicate with an eNB according to an S1 Application protocol (AP) (S1AP) or any other suitable interface. For another example, MME 206 may comprise a HSS interface (not shown) to communicate with one or more servers (e.g. HSS 144 of FIG. 1) in the core network. A HSS interface may comprise a S6 interface, or any other suitable interface.

In some demonstrative embodiments, MME 206 may include, for example, a processor and/or a memory, e.g., central processing unit (CPU), a digital signal processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an integrated circuit (IC), a controller, controller circuitry, scheduler circuitry, processor circuitry, memory circuitry, an application-specific IC (ASIC), or any other suitable multi-purpose or specific processor or controller, or any other suitable hardware, software and/or firmware components. In some demonstrative embodiments, some or all of the components of MME 206 may be enclosed in a common device and may be interconnected or operably associated using one or more wired or wireless links. In other embodiments, components of MME 206 may be distributed among multiple or separate devices. The processor may execute instruction, for example, of an OS of MME 206 and/or of one or more suitable applications.

In some demonstrative embodiments, P-GW 202 may provide one or more functionalities for 3GPP accesses connected to evolved packet core (EPC) via, e.g., a S5/S8 interface. In some embodiments, P-GW 202 may support one or more functionalities for access to EPC via non-3GPP accesses. For example, P-GW 202 may provide a gateway router to WLAN 212, e.g., via a S2a/S2b interface or any other suitable interface and/or S-GW 204 via, e.g., S5/S8 interface or any other suitable interface.

In some embodiments, S-GW 204 may manage one or more user data tunnels between eNB 208 and P-GW 202. Other embodiments may use other types of nodes.

As shown in FIGS. 2A and 2B, an EPS bearer may split over, e.g., a Wi-Fi link and a LTE link to achieve a higher throughput. In some other embodiment, an EPS bearer may be transmitted over, e.g., an RAN based integrated network that may comprise a 3GPP network, e.g. LTE, and a non-3GPP network, e.g., WLAN or other networks. In another embodiment, EPS bearer may be transmitted over, e.g., a core based integrated multi-RAT (e.g., LTE, WiFi, etc.) network. In some embodiments, FIG. 2A may relate to a core-based architecture and FIG. 2B may relate to a RAN-based architecture.

As shown in FIGS. 2A and 2B, a bearer splitting operation, e.g., a IP packet based bearer splitting operation, may be anchored at eNB 208 in a RAN-based architecture and/or P-GW 202 in a core-based architecture, respectively. For example, the bearer splitting operation may comprise bearer splitting, bearer reordering, bearer retransmission, and/or bearer mobility, etc. In some embodiments, bearer mobility may utilize only one radio access technology (RAT) to deliver a traffic, e.g., at a predetermined time. A mobility anchor (e.g., eNB 208 or P-GW 202) may be configured to perform a dynamic internet protocol (IP) header marking. In some embodiments, the mobility anchor may support bearer mobility to deliver cellular data traffic over a WLAN link or any other type of radio link.

In some embodiments, WLAN tunneling protocol (WLTP) may be used in transmitting, e.g., cellular data traffic over a WLAN link. In some embodiments, with bearer mobility, a bearer may be delivered over either WLAN and/or 3GPP RAN and/or may use U-plane control information that may be supported by dynamic IP header marking.

For example, for downlink, the mobility anchor may be configured to select one or more bits in an IP header of a packet. For example, the packet may comprise an IP packet that may be carried by, e.g. an EPS bearer. In some embodiments, the mobility anchor may further be configured to determine default value(s) (e.g., initial or original value) of the one or more selected bits. The mobility anchor may further map a marked bit value relating to the selected bit in the IP header of the packet to one or more corresponding modes. In some demonstrative embodiments, for downlink, the mobility anchor (e.g., eNB 206 or P-GW 202) may be configured to modify a bit value of a selected bit to a marked bit value and UE 220 may reset a marked bit value of the selected bit to its default value. For uplink, UE 220 may be configured to mark the packets and the mobility anchor (e.g., eNB 206 or P-GW 202) may be configured to reset the packets, e.g., modifying the marked bit value of the selected bit to its default value.

In some demonstrative embodiments, for downlink, the mobility anchor, e.g., eNB 208 or P-GW 202, may monitor one or more incoming packets of an EPS bearer, and/or detect if a default value of a selected bit of each of the packets has changed that may result in an invalid mapping. In some embodiments, the selected bit may be the same for all packets of an EPS bearer. In some embodiments, different bits may be used for different EPS bearers. In response to detecting that the default value of the selected bit has changed, the mobility anchor may stop modifying IP header and/or may send a message to notify UE 220 that the marking has stopped in response to or due to a change of the default value. In some embodiments, the message may comprise a sequence number of the last marked packet. The mobility anchor may reselect one or more bits for the one or more packets of the EPS bearer and/or may restart the marking on the reselected one or more bits after a time interval, e.g. 100 seconds or other time interval.

For uplink, UE 220 may monitor one or more incoming packets of an EPS bearer, and/or may detect if a default value of a selected bit for each of the one or more packets has changed in response to initiating a dynamic IP header marking. In response to detecting that the default value of the selected bit has changed, UE 220 may stop modifying an IP header of each packet and/or may send a message to notify the mobility anchor, e.g., eNB 208 or P-GW 202, that the marking has stopped due to a change in the default value. In some embodiments, the message may comprise a sequence number of the last marked packet. In some embodiments, the UE 220 may reselect one or more bits for marking and/or restart the marking after, e.g. a time interval, e.g., 100 seconds or other time interval.

In some demonstrative embodiments, a U-plane (e.g., data) packet may comprise one or more modes during bearer splitting. In some demonstrative embodiments, the following modes may be used (e.g. n=3, n may present a number of the modes of the U-plane data):

- a legacy mode: a packet may not subject to any change, and an IP header of the packet has not been modified.
- a sequencing mode: a packet may not subject to splitting and/or reordering, and/or an IP header of the packet may carry "a sequence number" of the packet that may be used for quality of service (QoS) measurement(s).
- a splitting mode: a packet may subject to splitting and/or ordering, and an IP header of the packet may carry "a sequence number" of the packet.

In some embodiments, eNB 208 or P-GW 202 may communicate with UE 220 to determine which bit/field of the IP header field (e.g. ToS, TTL, or DSCP and/or field, etc.) of the packet to reuse during bearer splitting or link aggregation in an integrated network, e.g., WLAN/3GPP integrated network or any other integrated network. In some embodiments, the eNB 208 and/or P-GW and/or UE 220 may determine to reuse the bit/field of the IP header in response to determining that the bit or field may not change during the transmission of the IP packet at least between a transmitting side to a receiving side.

Figure 3:
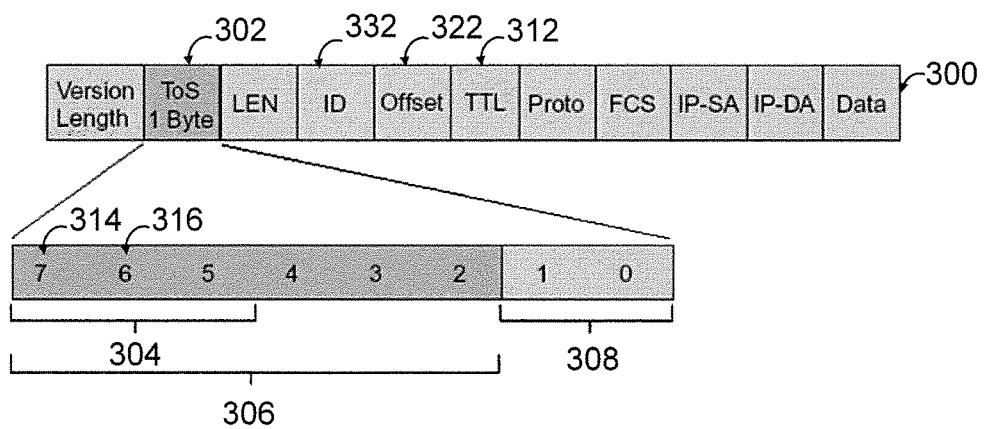
FIG. 3 is a schematic illustration of an example of an internet protocol (IP) header of a packet, in accordance with some demonstrative embodiments.

FIG. 3 demonstratively illustrates an example of an IP header format, in accordance with some demonstrative embodiments. In some embodiments, the IP header 300 may have a format of Internet Protocol Version 4 (IPv4), Internet Protocol Version 6 (IPv6) or any other format. As shown in FIG. 3, the IP header 300 may comprises one or more fields such as Type of Service (ToS) field 302 or a differentiate service code point (DSCP) field, TTL 312, and/or other field(s). In some embodiments, one or more fields, e.g., ToS 302, DSCP field 306, TTL 312 and/or other fields of the IP header 300 may be used to carry control information for bearer splitting and/or link aggregation.

For example, the control information for bearer splitting and/or link aggregation may comprise U-plane control information, e.g. a sequence number that may be a parameter for bearer splitting per packet. In some embodiments, bearer splitting or link aggregation may use one or more different types of links, e.g., WLAN (e.g., WiFi) links and/or 3GPP links to transport a traffic of a UE simultaneously. The sequence number may indicate an order of a packet on a transmitting side (e.g., eNB 208 and/or P-GW 202 for downlink or UE 220 for uplink). A receiving side (e.g., UE 220 for downlink or eNB 208 and/or P-GW 202 for uplink) may re-order one or more packets that may arrive at the receiving side out-of-order from two or more links in the link aggregation and/or may deliver the reordered packets to higher layer protocols, e.g., IP, Transmission Control Protocol (TCP)/User Datagram Protocol (UDP), etc.

In some demonstrative embodiments, the control information for bearer splitting and/or link aggregation may further relate to one or more modes during bearer splitting and/or link aggregation. For example, the one or more modes may comprise, e.g., a legacy mode, wherein a packet may not subject to any change, and an IP header of the packet has not been modified. In another example, the one or more modes may comprise, e.g., a sequencing mode, wherein a packet may not subject to splitting and/or ordering, but an IP header of the packet may still carry "a sequence number" that may be used for QoS measurements. In yet another example, the one or more modes may further comprise, e.g., a splitting mode, wherein a packet may subject to splitting and/or ordering, and an IP header of the packet may carry "a sequence number" of the packet.

FIG. 3 schematically illustrates an example of ToS field 302, the field 302 may comprise one or more bits, e.g., 1 byte, or other number of bits in some embodiments. In some embodiments, TOS field 302 may comprise, e.g., three, most significant bits (MSBs) 304 that may be used for IP precedence. In some embodiments, ToS field 302 may comprise a differentiated services code point (DSCP) 306 that may use one or more, e.g., six, or other number of bits for differentiated services (DS). In some embodiments, ToS 302 may further comprise one or more, e.g., two, or other number of unused bits that may be used for flow control for DSCP 306. In some embodiments, a ToS field 302 with any other format, e.g., IPv4, IPv6 or other IP version, may be used in various embodiments.

Figure 4:
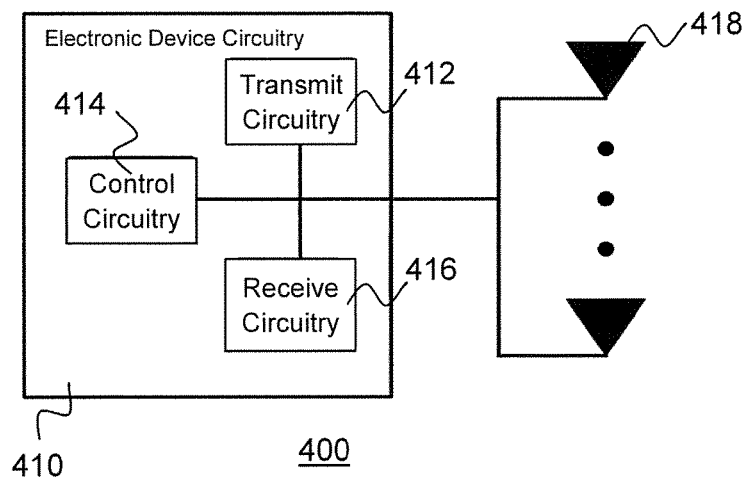
FIG. 4 is a schematic block diagram illustration of an example of an electronic device circuitry, in accordance with some demonstrative embodiments.

FIG. 4 schematically illustrates an example of an apparatus 400 according to an embodiment. The apparatus 400 may comprise an electronic device circuitry, e.g., a eNB circuitry, a UE circuitry, or other circuitry in accordance with various embodiments. For example, the apparatus 400 may communicate based on one or more wireless communication standards such as 3GPP LTE, 3GPP LTE-A, 3GPP LTE-U, WiMAX, HSPA, Bluetooth, WiFi, 5G standards, 6G standard or any future standards or other wireless standards in various embodiments. In some embodiments, electronic device circuitry 400 may communicate in a wireless local area network (WLAN), a wireless personal area network (WPAN), and/or a wireless wide area network (WWAN) or other network in various embodiments.

In various embodiments, electronic device circuitry 400 may be, or may be incorporated into or otherwise a part of, an eNB, a UE, or other electronic device. The electronic device circuitry 400 may comprise transmit circuitry 412 and/or receive circuitry 416 that may couple to control circuitry 414. In some embodiments, the transmit circuitry 412 and/or receive circuitry 416 may be elements or modules of transceiver or a transceiver circuitry. The electronic device circuitry 400 may be coupled with one or more plurality of antenna elements of one or more antennas 418. The electronic device circuitry 400 and/or the components of the electronic device circuitry 400 may be configured to perform operations similar to those described herein.

In some demonstrative embodiments, the electronic device circuitry 400 may be part of or comprise an application specific integrated circuit (ASIC), an electronic circuit, a processor (shared, dedicated, or group, single core, multi-core), and/or memory (shared, dedicated, or group) that may execute one or more software or firmware programs, a controller, a controller circuitry, a combinational logic circuit, and/or other suitable hardware components that may provide the described functionality. In some embodiments, the electronic device circuitry 400 may be implemented in, or functions associated with the circuitry may be implemented by, one or more software or firmware modules.

In some embodiments, control circuitry 414 may be coupled to transmit circuitry 412 and/or receive circuitry 416. In some embodiments, control circuitry 414 may control one or more functionalities and one or more communications of electronic device circuitry 400. In some demonstrative embodiments, control circuitry 414 may execute instructions of software and/or firmware, e.g., of an operating system (OS) and/or one or more applications of the electronic device circuitry 400. Control circuitry 414 may comprise or may be implemented using suitable circuitry, e.g., controller circuitry, scheduler circuitry, processor circuitry, memory circuitry, and/or any other circuitry, which may be configured to perform at least part of the functionality of the control circuitry 414. In some embodiments, one or more functionalities of control circuitry 414 may be implemented by logic, which may be executed by a machine and/or one or more processors.

In some embodiments, control circuitry 414 may comprise a central processing unit (CPU), a digital signal processor (DSP), a graphic processing unit (GPU), one or more processor cores, a single-core processor, a dual-core processor, a multiple-core processor, a microprocessor, a host processor, a controller, a plurality of processors or controllers, a chip, a microchip, a baseband circuitry, a radio frequency (RF) circuitry, a logic unit, an integrated circuit (IC), an application-specific IC (ASIC), or any other suitable or specific processor or controller, or one or more circuits or circuitry, and/or any combination thereof.

Figure 5:
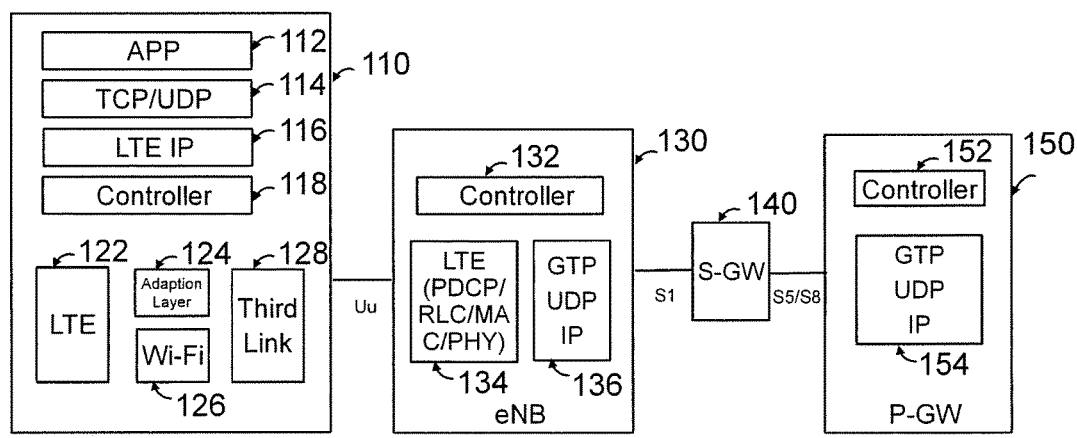
FIG. 5 is a schematic block diagram illustration of an example of a user-plane (U-plane) protocol stack, in accordance with some demonstrative embodiments.

FIG. 5 illustrates a schematic diagram of a 3GPP RAN U-plane protocol stack in accordance with some embodiments. In some embodiments, the 3GPP RAN U-plane protocol stack may support bearer splitting. In some embodiments, the stack structure may be applied for the core based architecture and/or the RAN based architecture of FIGS. 2A and 2B. In some embodiments, UE 110 may comprise a controller 118. The eNB 130 may comprise a controller 132. The P-GW 150 may comprise a controller 152. In some embodiment, the controller 118, 132 and/or 152 may be implemented by hardware, software and/or firmware or any combination thereof.

In some embodiment, controller 118 (e.g., for uplink), or 132 and/or 152 (e.g., for downlink) may each be configured to modify an IP header of a data packet to support transporting an EPS bearer over multiple radio (3GPP and/or Non-3GPP) access networks simultaneously, e.g., bearer splitting.

In some embodiments, for downlink, controller 132 and/or controller 152 may be configured to send, via a transmitter, a message to the UE 110 to request for one or more candidate bits that may be reused to support bearer splitting. Controller 118 may be configured to send, via, e.g. a transmitter, a message to the eNB 130 or P-GW 150 to request for one or more candidate bits that may be reused to support bearer splitting, e.g., for uplink.

In some embodiments, for downlink, controller 118 may be configured to send, via a transmitter, a message to eNB 130 or P-GW 150 to indicate which bit of the IP header field (e.g. type of service (ToS), time to live (TTL), or other fields, etc.) can be used for the bearer splitting. For uplink, controller 132 and/152 may be configured to send, via a transmitter, a message to UE 110 to indicate which bit of the IP header field (e.g. type of service (ToS), time to live (TTL), or other fields, etc.) can be used for the bearer splitting In some embodiments, for downlink, controller 132 and/or controller 152 may be configured to send, via a transmitter, a message to UE 110 to confirm the bits of the IP header field to be used, a mapping rule between the bit value and the bearer splitting mode that a packet may be subject to. Controller 118 may be configured to send, via a transmitter, a message to eNB 130 or P-GW 150 to confirm the bits of the IP header field to be used, a mapping rule between the bit value and the bearer splitting mode that a packet may be subject to, for uplink.

In some embodiments, for downlink, controller 132 and/or controller 152 may each be configured to monitor incoming packets and stop marking in response to detecting a default value of a packet has changed. Controller 118 may be configured to monitor incoming packets and stop marking in response to detecting a default value of the packets has changed, for uplink.

In some embodiments, for downlink, controller 132 and/or controller 152 may be configured to send, via a transmitter, a message to notify the UE 110 that the marking has stopped due to the change of the default, and the message may include a sequence number of the last marked IP packet. Controller 118 may be configured to send, via a transmitter, a message to notify eNB 130 or P-GW 150 that the marking has stopped due to the change of the default and the message may include a sequence number of the last marked IP packet, for uplink.

In some embodiments, the controller 118, 132 and/or 152 may each comprise a user-plane multi-link data convergence element or any other control or processing element or component that may perform one or more functionality of the controller. In some embodiments, the controller 118, 132 and/or 152 may each comprise a user-plane multi-link data convergence element or any other control or processing element or component that may be configured to perform one or more processes of FIGS. 6 and/or 7.

In some embodiments, FIG. 5 illustrate one or more layers in the 3GPP RAN U-plane protocol stack. For example, UE 110 may comprise one or more layers, e.g., application layer 112, TCP/UDP layer 114, LET IP layer 116, one or more layers 82 for LTE, one or more layers for WiFi, e.g., adaption layer 84, WiFi layer 86, and/or one or more layers 128 for any other link that may be used in the multi-link aggregation.

In some embodiments, the eNB 130 may comprise one or more layers 134 for LTE and/or one or more layers 136, e.g., general packet radioservice (GPRS) turning protocol (GTP) layer, UDP layer, or IP layer. P-GW 150 may comprise one or more layers 154, e.g., GTP layer, UDP layer, or IP layer.

While FIG. 5 illustrates an example of the 3GPP RAN U-plane protocol stack, some other embodiments may utilize a 3GPP RAN U-plane protocol stack with a different structure or different layers.

Figure 6:
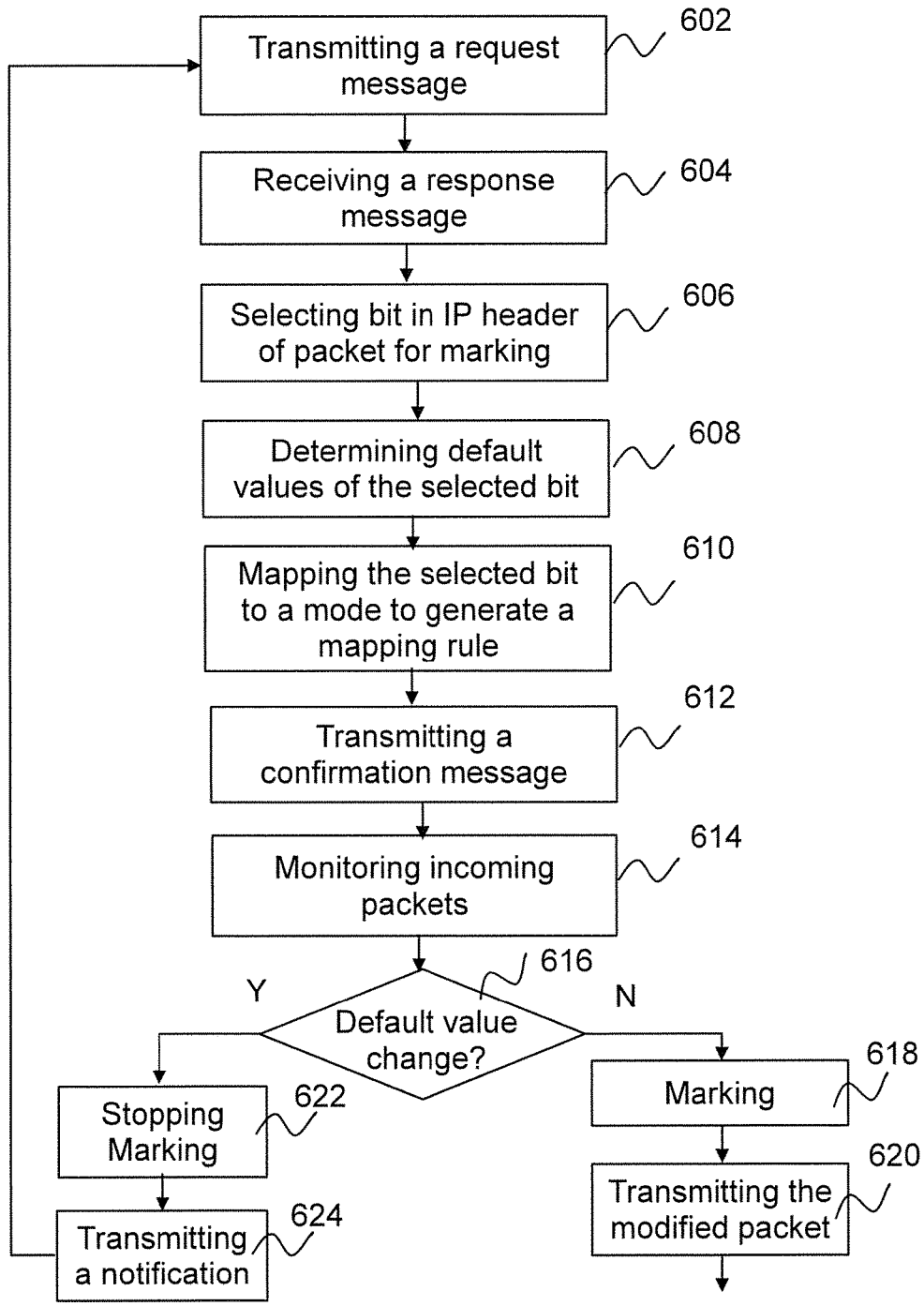
FIG. 6 is a schematic flow-chart illustration of an example of one or more processes, in accordance with some demonstrative embodiments.

FIG. 6 schematically illustrate a flow chart of an example of one or more processes in accordance with one or more embodiments. In some demonstrative embodiments, the one or more processes may be used by a base station, e.g., eNB and/or a gateway, e.g., P-GW, that may be used as a mobility anchor for downlink. In some embodiments, the eNB and/or P-GW may receive an incoming IP packet, e.g., of an EPS bearer, on a downlink.

FIG. 6 may be described for, e.g., eNB 208 as an example. In some other embodiments, P-GW 202 may perform the one or more processes of FIG. 6 for downlink. In some other embodiments, UE 220 may perform the one or more process of FIG. 6 for the uplink. In some embodiments, at 602, a controller (e.g., 414 of FIG. 4) of an eNB, e.g., eNB 208, may send a request message or other message to, e.g., UE 220 that may determine which bit(s) of an IP header field (e.g. ToS 302, TTL 312, DSCP field 306, etc.) of an incoming IP packet to use for the IP header marking. In some embodiments, for IP header marking on IP packets of an EPS bearer, the controller may select the same bit(s) in the IP header field of each of the IP packets. In some embodiments, controller may comprise a user-plane multi-link data convergence functional element. In some embodiments, the controller may transmit, via, e.g., transmitter 412, the request message to the UE 220 via, e.g., a Uu interface. In some embodiments, UE 220 may send a response message back to eNB 208 via the Uu interface in response to receiving the request message. In some other embodiments, 602 and/or 604 may not be required and the flow may go to 606.

In some demonstrative embodiments, the controller may process the incoming IP packet based on one or more modes of the bearer splitting and/or link aggregation. For example, the controller may de-capsulate the received IP packet to obtain the IP header and/or may modify the IP header.

At 604, the controller may receive, via a receiver 412, from UE 220 a response message or other message in response to transmitting the request message. In some embodiments the response message may comprise information (e.g. a bitmap of 8-bit or a different number of bits) to indicate one or more candidate bits that can be marked to carry control information for bearer splitting and/or link aggregation. In some other embodiments, UE 220 may not transmit the response message if the controller may skip 602. In some embodiments, the controller may skip 604 and may go to 606.

At 606, the controller of eNB 208 may select one or more bits for the IP header marking based on the response message from UE 220 and/or internal information that may be available at eNB 208 and/or the core network 140 (e.g., via monitoring downlink or uplink IP packets). In some embodiments, the controller may select the same bit for marking all packets that belong to the same EPS bearer. If UE 220 skips the transmitting of the response message to the controller or may not indicate which bit(s) for marking, the controller of eNB 208 may decide which bit(s) in the IP header to be used for marking based on the internal information only. For example, the controller may determine to use one or more bits in an IP header field, e.g., ToS, DSCP, TTL, and/or other field, etc.

In some demonstrative embodiments, one or more bits in the IP header may each have a default value or an initial value, e.g., prior to marking. At 608, the controller may determine or obtain the default values for the one or more selected bits based on the IP header of the IP packet. At 610, the controller may map one or more marked bit values of the selected bits to corresponding modes in, e.g., bearer splitting, to generate a mapping rule. In some embodiments, a mobility anchor, e.g., eNB 208 or P-GW 202, may determine the mapping rule dynamically based on which bit(s) are selected. In response to selecting the bit(s), the mobility anchor may determine a default value for each of the selected bit(s), e.g., prior to marking. In some embodiments, different marked values may be used for different modes.

For example, if the mode number n=3, and two bits, e.g., bit #7 (314 of FIG. 3) & bit #6 (316 of FIG. 3) may be selected, the following mapping rule may be used:

bit #7=0 and bit #6=0: legacy mode (may be a default mode)
bit #7=0 and bit #6=1: sequence mode
bit #7=1 and bit #6=0: splitting mode
bit #7=1 and bit #6=1: may be reserved While embodiments of the mapping rules and bits #7 and #6 in the embodiments above are illustrated, other embodiments may use one or more different bit(s) in the IP header of the packet, and/or a different default mode and/or different mode(s), and/or other embodiments may mark the packet with a different marked value for a selected bit. For example, a number of the selected bits may depend on a number of modes for bearer splitting.

At 612, the controller may send to UE 220 a confirmation message or other message that may indicate the one or more selected bits, the default values of the one or more selected bits and/or the mapping rule that may indicate how the marked bit values of the one or more selected bits are mapped to the corresponding mode, e.g., in response to 602, in response to selecting the bits at 606, determining the default values at 608 and/or mapping at 610.

At 614, the controller may monitor one or more selected bits in an IP header of each of the incoming packets of the EPS bearer, e.g., continuously. In some embodiments, the controller may perform the monitoring at 614 in response to transmitting the confirmation message or in response to a start of the marking or prior to marking the one or more selected bits at 618. The controller may monitor the one or more incoming packets to determine if a default value of the selected bit(s) has changed. In some embodiments, the controller may perform the monitoring at 614 at other time, e.g., prior to 610 and/or 612.

In some embodiments, a change in the default value may result in an invalid mapping. At 616, in response to detecting the default value change, the flow may go to 622. Contrarily, the flow may go to 618, in response that the default value change is not detected.

At 618, the controller may mark one or more selected bits of the IP header, e.g., based on the corresponding mode identified in the mapping rule. In some embodiments, the controller may modify a bit value of a selected bit in the IP header of the packet to a marked bit value to mark the packet. In some embodiments, the controller may set each selected bit by the marked bit value to mark the packet. For example, controller may mark or set each of bit #7 and/or bit #6 as "0" or "1" correspondingly based on the corresponding mode, wherein "0" or "1" may represent a marked bit value for a selected bit corresponding to a mode in bearer splitting.

In some embodiments, the following equation (1) may be used to obtain a number of bits in the IP header field (e.g. ToS) that may be reused for bearer splitting, wherein m may represent a number of bits in the IP header field, n may represent a number of modes for bearer splitting:

$$m=\text{ceiling}(\log(n)/\log(2)) \quad (1)$$

At 620, the controller may transmit, via a transmitter, to UE 220 one or more packets with the IP header of each packet modified, e.g., to include the selected bit(s) marked at 614. In some embodiments, at 620, the controller may transmit, via a transmitter, a modified packet in response to marking the packet and may return to 618 to mark and transmit a next packet. In some embodiments, the controller may perform the marking on the one or more packets one by one and/or may transmit the packets with the marked bit(s) in response to marking all of the packets.

In some embodiments, in response to transmitting the one or more modified packets of the EPS bearer, the controller may execute one or more from 602 to 624 to mark one or more packets of a second EPS bearer.

At 622, in response to detecting the default value change in a selected bit of the packet at 614, the controller may stop marking the selected bit or stop modifying the IP header of the packet or may not initiate the marking. At 622, the controller may notify UE 220 that the marking is stopped or is not initiated, e.g., due to the default value change, e.g., via a notification message or other message. In some embodiments, the controller may notify UE 220 of the default value change. In some embodiments, the notification message may comprise a sequence number of the last marked IP packet. For example, UE 220 may know at which packet to stop resetting the selected bits based on the sequence number.

At 624, the controller may return to 602 to reselect one or more bits in the IP header of the packet for marking and/or may restart marking the reselected bits, e.g., after a time interval of e.g., 100 seconds or other time interval. In some embodiments, the controller may return to 606 if 602 and 604 may be skipped as described above.

While FIG. 6 illustrates one or more processes that may be used by the mobility anchor, e.g., eNB 208, in some other embodiments, the P-GW 202 execute one or more or all processes 602 to 624 to mark one or more bits in an IP header of a packet to carry mode related information and/or any other control information for bearer splitting or link aggregation if the P-GW 202 is used as the mobility anchor for the downlink to transmit a packet via, e.g., one or more WLAN links 240 and/or one or more 3GPP links and/or other type of links.

While FIG. 6 illustrates one or more processes that may be used by the mobility anchor, e.g., eNB 208, for the downlink, in some other embodiments, if UE 220 is used as the transmitting side for the uplink to transmit a packet via, e.g., one or more WLAN links 230 and/or 240 and/or one or more 3GPP links and/or other type of links, the UE 220 may execute one or more or any of the processes 602 to 624 to mark one or more selected bits in an IP header of the packet to carry mode related information and/or any other control information for bearer splitting or link aggregation via the marked bits.

Figure 7:
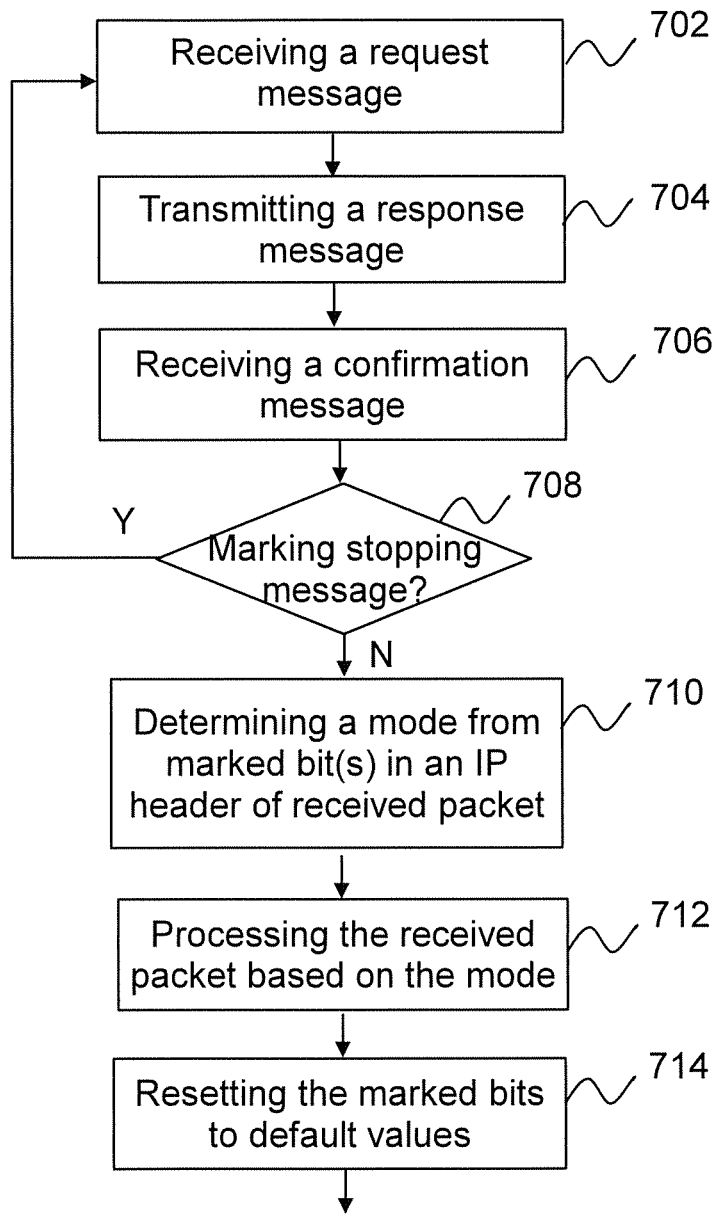
FIG. 7 is a schematic flow-chart illustration of an example of one or more processes, in accordance with some demonstrative embodiments.

FIG. 7 schematically illustrates a flow chart of an example of one or more processes in accordance with some embodiments. In some demonstrative embodiments, the one or more processes may be used by a mobile device, e.g., UE 220 that may reset an IP packet, e.g., modifying one or more selected bits in the IP header of the IP packet to a default value for downlink with a mobility anchor of eNB 208 or P-GW 202. In some embodiments, a controller (e.g., 414 of FIG. 4) of UE 220 may be configured to perform one or more of 702 to 714. In some embodiments, the controller may be provided in a baseband circuitry of the UE 220.

In some embodiments, at 702, the controller may receive, via, e.g., a receiver, a request message or other message from eNB 208 or P-GW 202. In some embodiments, the controller may receive, e.g., via the receiver 416, the request message from eNB 208 through, e.g., a Uu interface and/or from P-GW 202 through a tunnel between the UE 220 and the P-GW 202. In some other embodiments, the controller may skip 702 and may go to 704 if eNB 208 skip 602. In some embodiments, the controller may not perform 702 and may go to 704, if eNB 202 and/or P-GW 202 may not request for the candidate bits information.

At 704, the controller of UE 220 may transmit, via a transmitter 412, to eNB 208 and/or P-GW 202 a response message or other message to indicate one or more candidate bits an IP header field (e.g. ToS 302 or TTL 312, DSCP field 306, etc.) in the incoming IP packet that can be marked to carry information, e.g., control information, for bearer splitting and/or link aggregation. In some embodiments, the response message may comprise may comprise information, e.g. a bitmap of 8-bit or a different number of bits. In some other embodiments, the controller may skip transmitting of the response message at 704, if eNB 202 and/or P-GW 202 skips 602 or may have knowledge of the candidate bits. In some embodiments, the controller may transmit the response message to the eNB 208, e.g., through the Uu interface and/or to the P-GW 202, e.g., through the tunnel.

At 706, the controller may receive, via a receiver 412, a confirmation message or other message from eNB 208 through the Uu interface and/or P-GW 202 through the tunnel. In some embodiments, the confirmation message may comprise one or more selected bits for the IP header marking that may be determined by eNB 208 and/or P-GW 202 or selected by UE 220. In some embodiments, the confirmation message may comprise default values for the one or more selected bits determined by eNB 208 and/or P-GW 202. In some embodiments, the confirmation message may comprise the mapping rule that may indicate the mapping relationship information between the marked bit value of the one or more selected bits and the corresponding mode as determined by eNB 208 and/or P-GW 202.

At 708, the controller of UE 220 may check if the controller receives from eNB 208 and/or P-GW 202 a notification message or other message to indicate IP header marking being stopped. In some embodiments, the controller of UE 220 may obtain from the notification message a sequence number of the last marked IP packet. In response to receiving the notification message, the controller may determine at which packet to stop resetting the selected bits based on the sequence number.

In some embodiments, the controller may return to 702 to receive a new request message in response to determining that the marking stop notification message is received at 708. For example, referring to FIG. 7, the controller may determine marking candidate bits for the marking stopped packet in response to a new request message for the packet, e.g., at 702 and/or 704. In some embodiments, the controller of UE 220 may return to 706 to receive a new confirmation message in response to receiving the marking stop notification message at 708 if one or more of 702 to 704 are not required.

The controller may go to 710, if the marking stop notification message is not received or in response to determining that the marking has not stopped at 708. The controller may determine a mode for bearer splitting and/or link aggregation from the marked bit value(s) in the modified IP header of a received packet of an EPS bearer, e.g., from a network equipment, e.g., the eNB 208 and/or P-GW 202, based on the mapping rule information and/or the mapping relationship information in the confirmation message.

At 712, the controller may process the received packet from eNB 208 or P-GW 202, based on the mode determined at 710. For example, the controller may perform one or more bearer splitting operation on the received packet. In some embodiments, the controller may reorder one or more received packets of the EPS bearer and/or perform QoS measurements on the received packets.

At 714, the controller of UE 220 may reset the one or more marked bits in the IP headers of the received packets, e.g. resetting the one or more marked bits to their default values to obtain, e.g., a cellular data traffic or the EPS bearer without marking. In some embodiments, the controller may reset the marked bits in response to completing one or more bearer splitting operations on the one or more received packets. In some embodiments, the controller may determine whether to stop resetting a packets based on a sequence number of a last marked packet and/or may not reset a packet identified in the marking stop notification message.

While FIG. 7 illustrates that the controller of UE 220 may monitor the marking stop notification message at 708, in some embodiments, the controller may monitor whether the marking stop notification message is received in response to initiating a determination on the bearer splitting mode at 710 or e.g., continuously.

While FIG. 7 illustrates one or more processes that may be used by UE 220 as a receiving side in the downlink where the P-GW 202 and/or eNB 208 may be used as a mobility anchor, in some other embodiments of uplink, the P-GW 202 and/or eNB 208, as a mobility anchor, may execute the one or more or all processes 702 to 714, e.g., to process a packet received on one or more aggregated uplinks based on mode related information and may reset the marked bits in an IP header of the packet on, e.g., one or more WLAN links 240 and/or one or more 3GPP links and/or other type of links.

Figure 8:
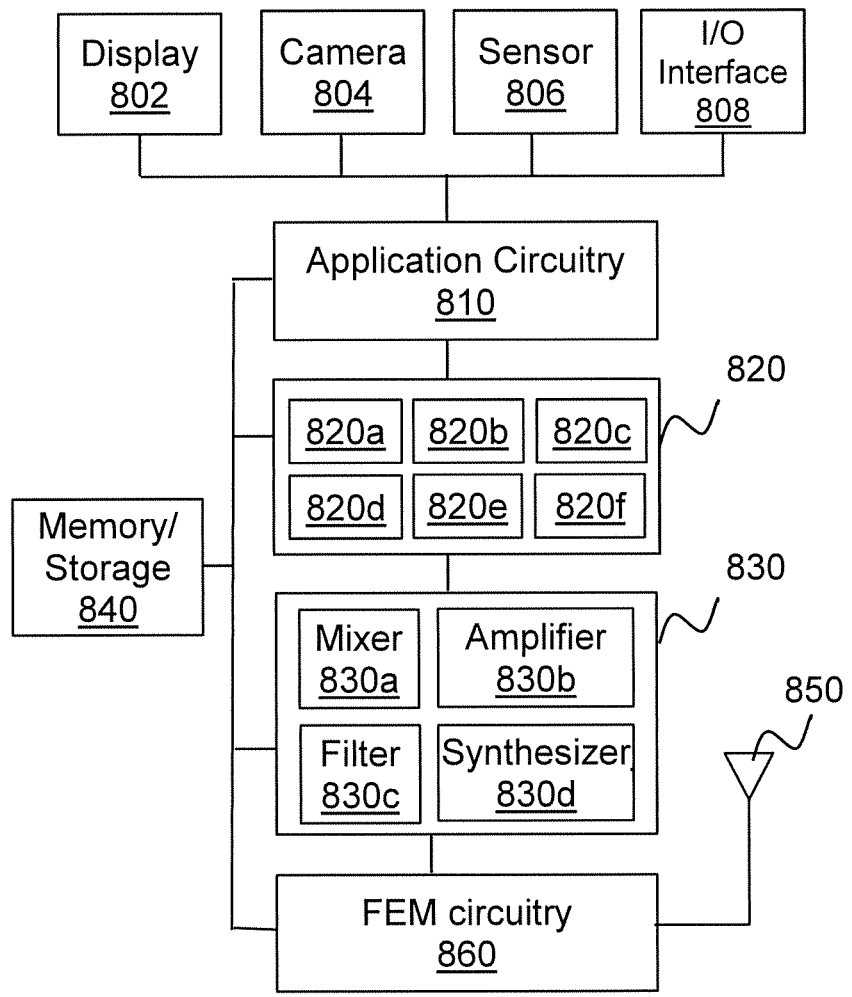
FIG. 8 is a schematic illustration of an example of a system, in accordance with some demonstrative embodiments.

Embodiments described herein may be implemented into a system using any suitably configured hardware, software and/or firmware. FIG. 8 illustrates, for one embodiment, an example system comprising radio frequency (RF) circuitry 830, baseband circuitry 820, application circuitry 810, front end module (FEM) circuitry 860, memory/storage 840, one or more antennas 850, display 802, camera 804, sensor 806, and input/output (I/O) interface 808, coupled with each other at least as shown. For one embodiment, FIG. 8 illustrates example components of a UE device 800 in accordance with some embodiments.

The application circuitry 810 may include one or more application processors. For example, the application circuitry 810 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 820 may include circuitry such as, but not limited to, one or more single-core or multi-core processors. The baseband circuitry 820 may include one or more baseband processors and/or control logic to process baseband signals received from a receive signal path of the RF circuitry 830 and to generate baseband signals for a transmit signal path of the RF circuitry 830. Baseband processing circuitry 820 may interface with the application circuitry 810 for generation and processing of the baseband signals and for controlling operations of the RF circuitry 830. For example, in some embodiments, the baseband circuitry 820 may include a second generation (2G) baseband processor 820a, a third generation (3G) baseband processor 820b, a fourth generation (4G) baseband processor 820c, and/or other baseband processor(s) 820d for other existing generations, generations in development or to be developed in the future (e.g., fifth generation (5G), 6G, etc.). The baseband circuitry 820 (e.g., one or more of baseband processors) may handle various radio control functions that enable communication with one or more radio networks via the RF circuitry 830. The radio control functions may include, but are not limited to, signal modulation/demodulation, encoding/decoding, radio frequency shifting, etc. In some embodiments, modulation/demodulation circuitry of the baseband circuitry 820 may include Fast-Fourier Transform (FFT), precoding, and/or constellation mapping/demapping functionality. In some embodiments, encoding/decoding circuitry of the baseband circuitry 820 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 820 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 820e of the baseband circuitry 820 may be configured to run elements of the protocol stack for signaling of the PHY, MAC, RLC, PDCP and/or RRC layers. In some embodiments, the baseband circuitry 820 may include one or more audio digital signal processor(s) (DSP) 820f that may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 820 and the application circuitry 810 may be implemented together such as, for example, on a system on a chip (SOC).

In some embodiments, the baseband circuitry 820 may provide for communication compatible with one or more radio technologies. For example, in some embodiments, the baseband circuitry 820 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 820 is configured to support radio communications of more than one wireless protocol may be referred to as multi-mode baseband circuitry.

RF circuitry 830 may enable communication with wireless networks using modulated electromagnetic radiation through a non-solid medium. In various embodiments, the RF circuitry 830 may include switches, filters, amplifiers, etc. to facilitate the communication with the wireless network. RF circuitry 830 may include a receive signal path which may include circuitry to down-convert RF signals received from the FEM circuitry 860 and provide baseband signals to the baseband circuitry 820. RF circuitry 830 may also include a transmit signal path which may include circuitry to up-convert baseband signals provided by the baseband circuitry 820 and provide RF output signals to the FEM circuitry 860 for transmission.

In some embodiments, the RF circuitry 830 may include a receive signal path and a transmit signal path. The receive signal path of the RF circuitry 830 may include mixer circuitry 830a, amplifier circuitry 830b and/or filter circuitry 830c. The transmit signal path of the RF circuitry 830 may include filter circuitry 830c and/or mixer circuitry 830a.

RF circuitry 830 may also include synthesizer circuitry 830d for synthesizing a frequency for use by the mixer circuitry 830a of the receive signal path and the transmit signal path. In some embodiments, the mixer circuitry 830a of the receive signal path may be configured to down-convert RF signals received from the FEM circuitry 860 based on the synthesized frequency provided by synthesizer circuitry 830d.

The amplifier circuitry 830b may be configured to amplify the down-converted signals. The filter circuitry 830c may be a low-pass filter (LPF) or band-pass filter (BPF) configured to remove unwanted signals from the down-converted signals to generate output baseband signals. Output baseband signals may be provided to the baseband circuitry 820 for further processing. In some embodiments, the output baseband signals may be zero-frequency baseband signals, although this is not a requirement. In some embodiments, mixer circuitry 830a of the receive signal path may comprise passive mixers, although the scope of the embodiments is not limited in this respect.

In some embodiments, the mixer circuitry 830a of the transmit signal path may be configured to up-convert input baseband signals based on the synthesized frequency provided by the synthesizer circuitry 830d to generate RF output signals for the FEM circuitry 860. The baseband signals may be provided by the baseband circuitry 820 and may be filtered by filter circuitry 830c. The filter circuitry 830c may include a low-pass filter (LPF), although the scope of the embodiments is not limited in this respect.

In some embodiments, the mixer circuitry 830a of the receive signal path and the mixer circuitry 830a of the transmit signal path may include two or more mixers and may be arranged for quadrature downconversion and/or upconversion respectively. In some embodiments, the mixer circuitry 830a of the receive signal path and the mixer circuitry 830a of the transmit signal path may include two or more mixers and may be arranged for image rejection (e.g., Hartley image rejection). In some embodiments, the mixer circuitry 830a of the receive signal path and the mixer circuitry 830a may be arranged for direct downconversion and/or direct upconversion, respectively. In some embodiments, the mixer circuitry 830a of the receive signal path and the mixer circuitry 830a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 830 may include analog-to-digital converter (ADC) and digital-to-analog converter (DAC) circuitry and the baseband circuitry 820 may include a digital baseband interface to communicate with the RF circuitry 830.

In some dual-mode embodiments, a separate radio IC circuitry may be provided for processing signals for each spectrum, although the scope of the embodiments is not limited in this respect.

In some embodiments, the synthesizer circuitry 830d may be a fractional-N synthesizer or a fractional N/N+1 synthesizer, although the scope of the embodiments is not limited in this respect as other types of frequency synthesizers may be suitable. For example, synthesizer circuitry 830d may be a delta-sigma synthesizer, a frequency multiplier, or a synthesizer comprising a phase-locked loop with a frequency divider.

The synthesizer circuitry 830d may be configured to synthesize an output frequency for use by the mixer circuitry 830a of the RF circuitry 830 based on a frequency input and a divider control input. In some embodiments, the synthesizer circuitry 830d may be a fractional N/N+1 synthesizer.

In some embodiments, frequency input may be provided by a voltage controlled oscillator (VCO), although that is not a requirement. Divider control input may be provided by either the baseband circuitry 820 or the applications processor 810 depending on the desired output frequency. In some embodiments, a divider control input (e.g., X) may be determined from a look-up table based on a channel indicated by the applications processor 810.

Synthesizer circuitry 830d of the RF circuitry 830 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 830d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 830 may include an IQ/polar converter.

FEM circuitry 860 may include a receive signal path which may include circuitry configured to operate on RF signals received from one or more antennas 850, amplify the received signals and provide the amplified versions of the received signals to the RF circuitry 830 for further processing. FEM circuitry 860 may also include a transmit signal path which may include circuitry configured to amplify signals for transmission provided by the RF circuitry 830 for transmission by one or more of the one or more antennas 850.

In some embodiments, the FEM circuitry 860 may include a TX/RX switch to switch between transmit mode and receive mode operation.

The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 830). The transmit signal path of the FEM circuitry 860 may include a power amplifier (PA) to amplify input RF signals (e.g., provided by RF circuitry 830), and one or more filters to generate RF signals for subsequent transmission (e.g., by one or more of the one or more antennas 850.

In some embodiments, the UE 800 comprises a plurality of power saving mechanisms. If the UE 800 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

In various embodiments, transmit circuitry, control circuitry, and/or receive circuitry discussed or described herein may be embodied in whole or in part in one or more of the RF circuitry 830, the baseband circuitry 820, FEM circuitry 860 and/or the application circuitry 810.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules or units.

In some embodiments, some or all of the constituent components of the baseband circuitry 820, the application circuitry 810, and/or the memory/storage may be implemented together on a system on a chip (SOC).

Memory/storage 840 may be used to load and store data and/or instructions, for example, for system. Memory/storage 840 for one embodiment may include any combination of suitable volatile memory (e.g., dynamic random access memory (DRAM)) and/or non-volatile memory (e.g., Flash memory).

In various embodiments, the I/O interface 808 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 806 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 802 may include a display (e.g., a liquid crystal display, a touch screen display, etc.).

In various embodiments, the system may comprise a mobile computing device such as, but not limited to, a laptop computing device, a tablet computing device, a netbook, an ultrabook, a smartphone, etc. or any other mobile device or system as disclosed herein. In various embodiments, the system may have more or less components, and/or different architectures.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules or units.

Figure 9:
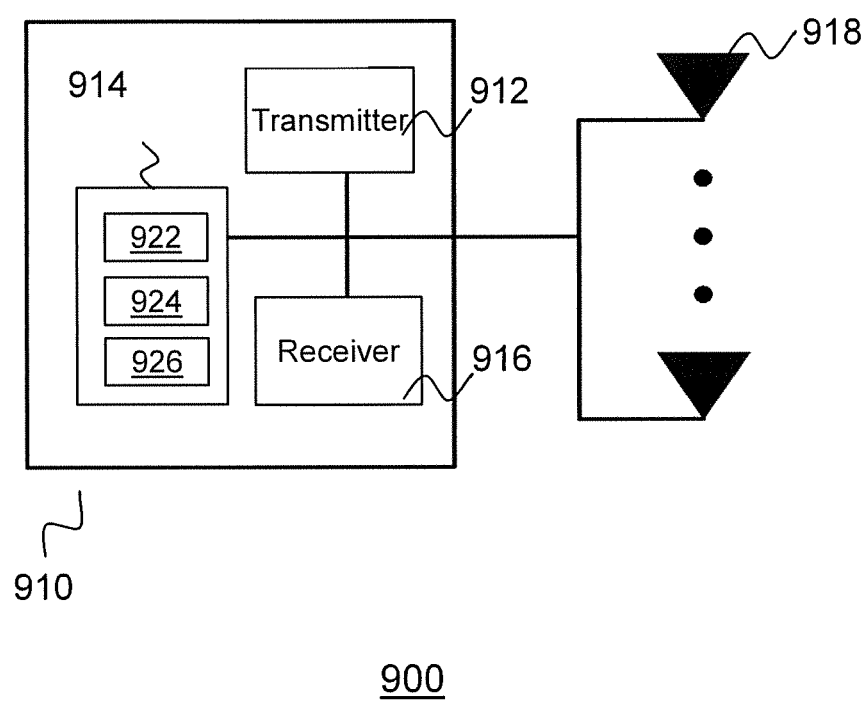

FIG. 9 schematically illustrates an example of a structure 900 according to some embodiments. The structure 900 may be comprise an electronic device circuitry, e.g., an eNB circuitry, a UE circuitry, a P-GW or other circuitry in accordance with various embodiments. For example, the structure 900 may communicate based on one or more wireless communication standards such as 3GPP LTE, 3GPP LTE-A, 3GPP LTE-U, WiMAX, HSPA, Bluetooth, WiFi, 5G standards, 6G standard or any future standards or other wireless standards in various embodiments. In some embodiments, the structure 900 may communicate in a wireless local area network (WLAN), a wireless personal area network (WPAN), and/or a wireless wide area network (WWAN) or other network in various embodiments.

In various embodiments, the structure 900 may be, or may be incorporated into or otherwise a part of, an eNB, a UE, a P-GW or other electronic device. The structure 900 may comprise a transmitter or transmit circuitry 912 and/or a receiver or receive circuitry 916 that may couple to a controller or control circuitry 914. In some embodiments, the transmitter 912 and/or receiver 916 may be elements or modules of transceiver or a transceiver circuitry. The structure 900 may be coupled with one or more plurality of antenna elements of one or more antennas 918. The structure 900 and/or the components of the structure 900 may be configured to perform operations similar to those described herein.

In some demonstrative embodiments, the structure 900 may be part of or comprise an application specific integrated circuit (ASIC), an electronic circuit, a processor (shared, dedicated, or group, single core, multi-core), and/or memory (shared, dedicated, or group) that may execute one or more software or firmware programs, a controller, a controller circuitry, a combinational logic circuit, and/or other suitable hardware components that may provide the described functionality. In some embodiments, the structure 900 may be implemented in, or functions associated with the circuitry may be implemented by, one or more software or firmware modules.

In some embodiments, controller 914 may be coupled to transmitter 912 and/or receiver 916. In some embodiments, controller 914 may control one or more functionalities and one or more communications of structure 900. In some demonstrative embodiments, controller 914 may execute instructions of software and/or firmware, e.g., of an operating system (OS) and/or one or more applications of the structure 900. Controller 914 may comprise or may be implemented using suitable circuitry, e.g., controller circuitry, scheduler circuitry, processor circuitry, memory circuitry, and/or any other circuitry, which may be configured to perform at least part of the functionality of the controller 914. In some embodiments, one or more functionalities of controller 914 may be implemented by logic, which may be executed by a machine and/or one or more processors.

In some embodiments, controller 914 may comprise a central processing unit (CPU), a digital signal processor (DSP), a graphic processing unit (GPU), one or more processor cores, a single-core processor, a dual-core processor, a multiple-core processor, a microprocessor, a host processor, a controller, a plurality of processors or controllers, a chip, a microchip, a baseband circuitry, a radio frequency (RF) circuitry, a logic unit, an integrated circuit (IC), an application-specific IC (ASIC), or any other suitable or specific processor or controller, or one or more circuits or circuitry, and/or any combination thereof.

In some embodiment, the structure 900 may comprise a network equipment (NE), e.g. a base station, e.g., eNB, or a P-GW. In some embodiments, the NE 900 may comprise the receiver 916 that may receive, e.g., one or more uplink (UL) data packets from a UE, e.g., 120. For example, an UL data packet in the received UL data packets may comprise one or more selected bits that may each have a marked bit value. In some other embodiments, one or more UL data packets may comprise selected bit(s) with marked value(s).

In some embodiments, controller 914 may comprise a selection controller 922 that may select one or more of, e.g., one or more bits in an internet protocol (IP) header of a downlink data packet, a bit value for each selected bit in the downlink data packet, and/or a downlink mapping rule between the bit value for each selected bit in the downlink data packet and a downlink bearer splitting mode.

In some embodiments, the controller 914 may comprise a downlink (DL) marking controller 924. In some embodiments, the DL marking controller 924 may mark the one or more selected bits in, e.g., a downlink data packet, to have the one or more selected bit value based on the downlink mapping rule selected by the selection controller 922. In some embodiments, the one or more marked bits in the downlink data packet may indicate the downlink bearer splitting mode for downlink bearer splitting. In some embodiments, downlink marking controller 924 may mark selected bit(s) of one or more downlink data packets with selected bit value(s). In some embodiments, one or more downlink data packets may be utilized to indicate the downlink bearer splitting mode for UE 120.

In some embodiments, the controller 914 may comprise an UL bearer splitting controller 926. In some embodiments, UL bearer splitting controller 926 may identify an uplink bearer splitting mode from one or more marked bit values of selected bit(s) in an uplink data packet from UE 120, based on an uplink mapping rule between the uplink bear splitting mode and the marked bit value(s) of one or more selected bits in the uplink data packet. In some embodiments, UL bearer splitting controller 926 may perform a bearer spitting operation on the one or more UL data packets from UE 120 based on the identified uplink bear splitting mode. In some embodiments, UL bearer splitting controller 926 may reset the one or more selected bits in the UL data packet to their default value(s). In some embodiment, the uplink bearer splitting controller 926 may identify the uplink bearer splitting mode from one or more marked values of selected bit(s) in one or more uplink data packets from UE 120.

In some embodiments, NE 900 may comprise the transmitter 912 that may transmit one or more DL data packets to UE 120.

In some embodiments, selection controller 922 may send a first message to UE 120 to request for one or more candidates for the one or more selected bits in the downlink data packet, e.g., via the transmitter 912.

In some embodiments, the selection controller 922 may select the one or more bits based on a second message from UE 120 that may indicate the one or more candidates for the one or more selected bits in the downlink data packet.

In some embodiments, the selection controller 922 may confirm the one or more selected bits in the downlink data packet, the downlink mapping rule between a bit value of each selected bit, and/or the selected downlink bearer splitting mode.

In some embodiments, the uplink bearer splitting controller 926 may monitor a default value of the one or more selected bits in the uplink data packet to determine if the default value has changed.

In some embodiments, the DL marking controller 924 may further modify a default value of the one or more selected bits in the DL data packet by the selected bit value to mark selected bits. In some embodiments, the DL packet controller 924 may stop marking selected bit(s) in the downlink data packet in response to determining that a default value of the DL data packet has changed.

In some embodiments, the DL marking controller 924 may further stop marking the one or more selected bits in the downlink data packet, in response to detecting that a default value of the DL data packet has changed. In some embodiments, the DL marking controller 924 may send a message to notify UE 120 that marking the selected bits of the DL data packet has stopped. In some embodiments, the message may comprise a sequence number of a last marked DL data packet in the one or more DL data packets.

In some embodiments, the selected bits of the downlink data packet may be in a Type of Service (ToS) field, a Time to Live (TTL) field and/or a differentiate service code point (DSCP) field in an IP header of the downlink data packet.

In some embodiments, a dynamic IP header marking mechanism may operate between NE 900, e.g., an eNB or a P-GW, and a UE. In embodiments, the NE 900 may select the one or more bits, determine their default values, and/or mapping a marked bit value to a downlink bearer splitting mode. For an uplink, a UE may be used for marking, and eNB (or P-GW) may be used for resetting. For a downlink, it may be vice versa.

In some other embodiments, the structure 900 may be used for a UE. For example. UE 900 may comprise a receiver 916 to receive one or more DL data packets from a base station, e.g., eNB 132 or 134. In some embodiments, one or more of the received DL data packets may comprise one or more selected bits each with a marked bit value.

In some embodiments, UE 900 may comprise a selection controller 922 to select one or more bits in an internet protocol (IP) header of an uplink data packet as candidate bits for the one or more selected bits for uplink marking. In some embodiments, the selection controller 922 may select one or more of, e.g., one or more bits in an internet protocol (IP) header of an uplink data packet, a bit value for each selected bit in the downlink data packet, and/or an uplink mapping rule between the bit value for each selected bit in the downlink data packet and an uplink bearer splitting mode.

In some embodiments, UE 900 may comprise a DL bearer splitting controller 924 that may identify a downlink bearer splitting mode based on a downlink mapping rule between the downlink bearer splitting mode and the marked bit value(s) of the selected bit(s) in the downlink data packet from eNB 132 or 134. In some embodiments, the DL bearer splitting controller 924 may perform a bearer spitting operation on the one or more downlink data packet from eNB 132 or 134 based on the identified downlink bearer splitting mode. In some embodiments, DL bearer splitting controller 924 may reset the selected bits in the DL packet data to their default values In some embodiments, an UL marking controller 926 of UE 900 may mark the selected bits in an uplink data packet to have the selected bit values based on a selected uplink mapping rule to indicate an uplink bearer splitting mode.

In some embodiments, UE 900 may comprise the transmitter 912 to transmit the one or more uplink data packets to a NE, e.g., eNB or P-GW.

In some embodiments, the DL bearer splitting controller 924 may further reset the selected bits of the downlink packet data from eNB or P-GW to a default value in response to completing the downlink bearer splitting operation.

In some embodiments, the selection controller 922 of UE 900 may further receive from a NE, via the receiver 916, a request message to determine one or more candidates for the selected bits to be marked. In some embodiments, the one or more candidates may comprise one or more of a Type of Service (ToS) field, a Time to Live (TTL) field, or a differentiate service code point (DSCP) field, e.g., in an heard of the uplink data packet.

In some embodiments, the selection controller 922 of UE 900 may further send to the NE, via the transmitter 912, a response message to indicate one or more candidate bits for the selected bits to be marked.

In some embodiments, the selection controller 922 of UE 900 may further receive a confirmation message from the NE to comprise the selected bits, a default value of the selected bits, and/or the mapping rule.

In some embodiments, the DL bearer splitting controller 924 of UE 900 may further receive from the NE a notification message to notify that the NE has stopped marking the selected bit(s), wherein the message may comprise a sequence number of a last marked data packet in the one or more downlink data packets.

In some embodiments, selection controller 922 of UE 900 may further reselect one or more candidate bits for the selected bit(s) of the downlink data packet based on an indication in a marking stop notification message. The marking stop notification message may indicate a marking for the downlink data packet is stopped relating to a change in a default value of the selected bit(s).

In some embodiments, DL bearer splitting controller 924 of UE 900 may further stop resetting the selected bit(s) of the downlink data packet based on a sequence number in a marking stop notification message from the NE, wherein the marking stop notification message to indicate a marking to the data packet is stopped.

In some embodiments, DL bearer splitting controller 924 of UE 900 may further identify the downlink bearer splitting mode from one or more marked bit values of the selected bit(s) based on information relating to the downlink mapping rule in a confirmation message to the UE 900.

In some embodiments, DL bearer splitting controller 924 of UE 900 may further to reorder the one or more received downlink data packets based on the downlink bearer splitting mode.

In some embodiments, DL bearer splitting controller 924 of UE 900 may further reset the selected bit(s) to a default value in response to completing a reordering of the one or more downlink data packets based on the downlink bearer splitting mode.

In some embodiments, DL bearer splitting controller 924 of UE 900 further to reset the selected bit to a default value to obtain the data packet with the default value.

In some embodiments, UL marking controller 926 of UE 900 may further modify a default value of the selected bits of the uplink data packet to have the selected bit value to mark the selected bits. In some embodiments, one or more selected bits of one or more uplink data packets may be marked.

In some embodiments, UL marking controller 926 of UE 900 may stop marking the selected bits of the uplink data packet in response to determining that a default value of the uplink data packet has changed. In some embodiments, UL marking controller 926 of UE 900 may send a message to notify the NE that marking the selected bits has stopped and the message to comprise a sequence number of a last marked uplink data packet.

In some embodiments, UL bearer splitting controller 926 of the NE may further stop resetting the selected bits of the uplink data packet based on a sequence number in a marking stop notification message from the UE. The marking stop notification message may indicate a marking to the uplink data packet is stopped.

In some embodiments, UL bearer splitting controller 926 of the NE may further identify the uplink bearer splitting mode from marked bit value(s) of one or more selected bits in the uplink data packet based on information relating to the uplink mapping rule.

In some embodiments, the UL bearer splitting controller 926 of the NE may further reorder the uplink data packets from UE 900 based on the identified uplink bearer splitting mode.

In some embodiments, the bearer splitting controller 926 of the NE may reset each selected bit in the uplink data packet to a default value in response to completing a reordering of the uplink data packets based on the identified uplink bearer splitting mode.

While FIG. 9 illustrates an example structure of a NE or a UE, in some embodiments, the structure may comprise one or more other components. While FIG. 9 illustrates one or more controllers, in some embodiments, the one or more controllers may be implemented in one or more controller, one or more processors or one or more control circuitries or other apparatus or system.

EXAMPLES

The following examples pertain to further embodiments.

Example 1 may include a network equipment (NE), comprising: a selection controller to select one or more bits in an internet protocol (IP) header of a first downlink data packet, or one or more bit values for the one or more selected bits of the first downlink data packet, or a mapping rule between the one or more selected bit values and a downlink bearer splitting mode; a downlink marking controller to mark the one or more selected bits of the downlink data packet to have the one or more selected bit values based on the downlink mapping rule; and an uplink bearer splitting controller to identify an uplink bearer splitting mode from one or more marked bit values of one or more selected bits in a first uplink data packet from the UE based on an uplink mapping rule between the uplink bear splitting mode and the one or more marked bit values.

Example 2 may include the subject matter of Example 1 or some other examples described herein, wherein the uplink bearer splitting controller further to: perform a bearer spitting operation on one or more second uplink data packets from the UE based on the identified uplink bear splitting mode.

Example 3 may include the subject matter of Examples 1 or 2 or some other examples described herein, wherein the uplink bearer splitting controller further to: reset each selected bit in the uplink data packet to a default value of the selected bit.

Example 4 may include the subject matter of any one of Examples 1 to 3 or some other examples described herein, further comprising: a receiver to receive one or more second uplink data packets from the UE.

Example 5 may include the subject matter of any one of Examples 1 to 4 or some other examples described herein, further comprising: a transmitter to transmit one or more second downlink data packets to the UE.

Example 6 may include the subject matter of any one of Examples 1 to 5 or some other examples described herein, wherein the selection controller further to: provide a first message to the UE to request for one or more candidates for the one or more selected bits in the first downlink data packet;

Example 7 may include the subject matter of any one of Examples 1 to 6 or some other examples described herein, wherein the selection controller further to: confirm one of more of the one or more selected bits in the first downlink data packet, the downlink mapping rule between the selected bit value of each selected bit, and the selected downlink bearer splitting mode.

Example 8 may include the subject matter of any one of Examples 1 to 7 or some other examples described herein, wherein the uplink bearer splitting controller further to: monitor a default value of each selected bit in the first uplink data packet to determine if the default value has changed; and Example 9 may include the subject matter of any one of Examples 1 to 8 or some other examples described herein, wherein the downlink marking controller further to: modify a default value of each selected bit of the first downlink data packet with a selected bit value to mark each selected bit of the first downlink data packet.

Example 10 may include the subject matter of any one of Examples 1 to 9 or some other examples described herein, wherein the downlink marking controller to stop marking one or more selected bits in the first downlink data packet in response to determining that a default value of the first downlink data packet has changed.

Example 11 may include the subject matter of any one of Examples 1 to 10 or some other examples described herein, wherein the downlink marking controller further to: stop marking the one or more selected bits in the first downlink data packet, in response to detecting that a default value of the first downlink data packet has changed.

Example 12 may include the subject matter of any one of Examples 1 to 11 or some other examples described herein, wherein the downlink marking controller may further to: provide a message to notify the UE to stop marking the selected bits of the first downlink data packet, wherein the message to comprise a sequence number of a last marked downlink data packet in the one or more downlink data packets.

Example 13 may include the subject matter of any one of Examples 1 to 12 or some other examples described herein, wherein the selected bits of the first downlink data packet are in a Type of Service (ToS) field, a Time to Live (TTL) field or a differentiate service code point (DSCP) field in an IP header of the first downlink data packet.

Example 14 may include the subject matter of any one of Examples 1 to 13 or some other examples described herein, wherein the uplink bearer splitting controller further to: stop resetting the one or more selected bits of the first uplink data packet based on a sequence number in a marking stop notification message from the UE, wherein the marking stop notification message to indicate a marking to the first uplink data packet is stopped.

Example 15 may include the subject matter of any one of Examples 1 to 14 or some other examples described herein, wherein the uplink bearer splitting controller further to: identify the uplink bearer splitting mode from one or more marked bit values of one or more selected bits in the first uplink data packet based on information relating to the uplink mapping rule.

Example 16 may include the subject matter of any one of Examples 1 to 15 or some other examples described herein, wherein the uplink bearer splitting controller further to: reorder one or more uplink data packets from the UE based on the identified uplink bearer splitting mode.

Example 17 may include the subject matter of any one of Examples 1 to 16 or some other examples described herein, wherein the bearer splitting controller further to: reset each selected bit in the first uplink data packet to a default value in response to completing a reordering of one or more uplink data packets from UE based on the identified uplink bearer splitting mode.

Example 18 may include a user equipment, comprising: a selection controller to select one or more bits in an internet protocol (IP) header of a first uplink data packet, or one or more bit values for the one or more selected bits, or an uplink mapping rule between the one or more selected bit values and an uplink bearer splitting mode; an uplink marking controller to mark the one or more selected bits in the first uplink data packet to have the one or more selected bit values based on the uplink mapping rule to indicate the uplink bearer splitting mode; and a downlink bearer splitting controller to identify a downlink bearer splitting mode based on a downlink mapping rule between the downlink bearer splitting mode and one or more marked bit value of one or more selected bits in a first downlink data packet from a network equipment.

Example 19 may include the subject matter of any one of Example 18 or some other examples described herein, wherein the downlink bearer splitting controller further to: perform a bearer spitting operation on one or more second downlink data packets from the NE based on the identified downlink bearer splitting mode.

Example 20 may include the subject matter of any one of Examples 18 or 19 or some other examples described herein, wherein the downlink bearer splitting controller further to: reset the one or more selected bits in the first downlink packet data to one or more default values in response to completing the downlink bearer splitting operation.

Example 21 may include the subject matter of any one of Examples 18 to 20 or some other examples described herein, wherein the selection controller further to: obtain from the NE a request message to determine one or more candidates for the one or more selected bits of the first uplink data packet to be marked.

Example 22 may include the subject matter of any one of Examples 18 to 21 or some other examples described herein, wherein the one or more candidates to comprise one or more of a Type of Service (ToS) field, a Time to Live (TTL) field, or a differentiate service code point (DSCP) field, e.g., in an heard of the uplink data packet.

Example 23 may include the subject matter of any one of Examples 18 to 22 or some other examples described herein, wherein the selection controller further to: provide to the NE, a response message to indicate the one or more candidates for the one or more selected bits to be marked.

Example 24 may include the subject matter of any one of Examples 18 to 23 or some other examples described herein, wherein the selection controller further to: obtain a confirmation message from the NE to comprise the one or more selected bits, the one or more default values of the one or more selected bits of the first downlink data packet, and/or the downlink mapping rule.

Example 25 may include the subject matter of any one of Examples 18 to 24 or some other examples described herein, wherein the downlink bearer splitting controller further to: obtain from the NE a notification message to notify that the NE has stopped marking the one or more selected bit of the first downlink data packet, wherein the notification message to comprise a sequence number of a last marked data packet in one or more downlink data packets from NE.

Example 26 may include the subject matter of any one of Examples 18 to 25 or some other examples described herein, wherein the selection controller further to: reselect one or more candidate bits for the one or more selected bits of the first downlink data packet based on an indication in a marking stop notification message, wherein the marking stop notification message to indicate that a marking for the first downlink data packet is stopped relating to a change in a default value of the one or more selected bits of the first downlink data packet.

Example 27 may include the subject matter of any one of Examples 18 to 26 or some other examples described herein, wherein the downlink bearer splitting controller further to: stop resetting the one or more selected bits of the first downlink data packet based on a sequence number in a marking stop notification message from the NE, wherein the marking stop notification message to indicate a marking to the data packet is stopped.

Example 28 may include the subject matter of any one of Examples 18 to 27 or some other examples described herein, wherein the downlink bearer splitting controller further to: identify the downlink bearer splitting mode from one or more marked bit values of the one or more selected bits based on information relating to the downlink mapping rule in a confirmation message to the UE.

Example 29 may include the subject matter of any one of Examples 18 to 28 or some other examples described herein, wherein the downlink bearer splitting controller further to: reorder one or more downlink data packets from NE based on the downlink bearer splitting mode.

Example 30 may include the subject matter of any one of Examples 18 to 29 or some other examples described herein, wherein the downlink bearer splitting controller further to: reset the one or more selected bits to one or more default values in response to completing a reordering of one or more downlink data packets from the NE based on the downlink bearer splitting mode.

Example 31 may include the subject matter of any one of Examples 18 to 30 or some other examples described herein, wherein the uplink marking controller further to: modify the one or more default values of the one or more selected bits of the first uplink data packet to have the one or more selected bit values to mark the one or more selected bits.

Example 32 may include the subject matter of any one of Examples 18 to 31 or some other examples described herein, wherein the uplink marking controller further to: stop marking the one or more selected bits of the first uplink data packet in response to determining that a default value of the first uplink data packet has changed.

Example 33 may include the subject matter of any one of Examples 18 to 32 or some other examples described herein, wherein the uplink marking controller further to: send a message to notify the NE that marking the selected bits of the first uplink data packet has stopped, wherein the message to comprise a sequence number of a last marked uplink data packet.

Example 34 may include the subject matter of any one of Examples 18 to 33 or some other examples described herein, further comprising: a receiver to receive one or more downlink data packets from a NE, wherein the one or more of the received downlink data packets to comprise one or more selected bits each with a marked bit value.

Example 35 may include the subject matter of any one of Examples 18 to 34 or some other examples described herein, wherein the selection controller further to: select one or more of one or more bits in an internet protocol (IP) header of the first uplink data packet, a bit value for each selected bit in the first downlink data packet, or an uplink mapping rule between the bit value for each selected bit in the first downlink data packet and an uplink bearer splitting mode.

Example 36 may include a machine-readable medium having instructions, stored thereon, that when executed cause a user equipment (UE) to: select one or more bits in an internet protocol (IP) header field of a data packet that is received on an integrated network, modify a bit value of each of the one or more bits to a marked bit value; and transmit the data packet that has the one or more bits with the modified bit values over the integrated network, wherein the one or more modified bit values correspond to one or more bearer splitting mode of the data packet.

Example 37 may include the subject matter of Example 36 or some other examples described herein, having instructions, stored thereon, that when executed cause a user equipment to: map the modified bit values to the bearer splitting modes based on a mapping rule.

Example 38 may include the subject matter of Examples 36 or 37 or some other examples described herein, having instructions, stored thereon, that when executed cause a user equipment to: request for one or more candidates for the one or more bits; and select the one or more bits based on a response that comprise the one or more candidates.

Example 39 may include the subject matter of any one of Examples 36 to 38 or some other examples described herein, having instructions, stored thereon, that when executed cause a user equipment to: select the one or more bits in a Type of Service (ToS) field or a Time to Live (TTL) field of the data packet.

Example 40 may include the subject matter of any one of Examples 36 to 39 or some other examples described herein, having instructions, stored thereon, that when executed cause a user equipment to: select one or more most significant bits of a Type of Service (ToS) field of the data packet for the one or more bits.

Example 41 may include the subject matter of any one of Examples 36 to 40 or some other examples described herein, having instructions, stored thereon, that when executed cause a user equipment to: provide a message to confirm the one or more bits, the default value of each of the one or more bits, and the mapping rule that indicates how the modified value of each of the one or more bits is mapped to the bearer splitting mode.

Example 42 may include the subject matter of any one of Examples 36 to 41 or some other examples described herein, having instructions, stored thereon, that when executed cause a user equipment to: monitor the default value of each of the one or more bits to check a change in the default value in response to initiating modifying the bit value of each of the one or more bits to the marked bit value.

Example 43 may include the subject matter of any one of Examples 36 to 42 or some other examples described herein, having instructions, stored thereon, that when executed cause a user equipment to: monitor the default value of each of the one or more bits continuously.

Example 44 may include the subject matter of any one of Examples 36 to 43 or some other examples described herein, having instructions, stored thereon, that when executed cause a user equipment to: stop modifying the bit value of each of the one or more bits in response to detecting that the default value of each of the one or more bits has changed.

Example 45 may include the subject matter of any one of Examples 36 to 44 or some other examples described herein, having instructions, stored thereon, that when executed cause a user equipment to: provide a notification associated with the change of the default value of each of the one or more bits in response to detecting that the default value of each of the one or more bits has changed, wherein the notification to indicate comprise a sequence number of a last data packet with the one or more modified.

Example 46 may include a method that may comprise selecting one or more bits in an IP header field of a packet that is received on an integrated network, modifying a bit value of each of the one or more bits to a marked bit value; and transmitting the packet that has the one or more bits with the modified bit values over the integrated network, wherein the one or more modified bit values correspond to one or more bearer splitting mode of the packet.

Example 47 may include the subject matter of Example 46 or some other examples described herein, that may further comprise mapping the modified bit values to the bearer splitting modes based on a mapping rule.

Example 48 may include the subject matter of any one of Examples 46 or 47 or some other examples described herein, that may further comprise requesting for one or more candidates for the one or more bits; and selecting the one or more bits based on a response that comprise the one or more candidates.

Example 49 may include the subject matter of any one of Examples 46 to 48 or some other examples described herein, that may further comprise selecting the one or more bits in a ToS field or a TTL field of the packet.

Example 50 may include the subject matter of any one of Examples 46 to 49 or some other examples described herein, that may further comprise selecting the most significant bits of a ToS field of the packet for the one or more bits.

Example 51 may include the subject matter of any one of Examples 46 to 50 or some other examples described herein, that may further comprise providing a message to confirm the one or more bits, the default value of each of the one or more bits, and the mapping rule that indicates how the modified value of each of the one or more bits is mapped to the bearer splitting mode.

Example 52 may include the subject matter of any one of Examples 46 to 51 or some other examples described herein, that may further comprise monitoring the default value of each of the one or more bits to check a change in the default value prior to modifying the bit value of each of the one or more bits to the marked bit value.

Example 53 may include the subject matter of any one of Examples 46 to 52 or some other examples described herein, that may further comprise monitoring the default value of each of the one or more bits continuously.

Example 54 may include the subject matter of any one of Examples 46 to 53 or some other examples described herein, that may further comprise stop modifying the bit value of each of the one or more bits in response to detecting that the default value of each of the one or more bits has changed.

Example 55 may include the subject matter of any one of Examples 46 to 54 or some other examples described herein, that may further comprise providing a notification associated with the change of the default value of each of the one or more bits in response to detecting that the default value of each of the one or more bits has changed, wherein the notification to indicate comprise a sequence number of a last packet with the one or more modified.

Example 56 may include the subject matter of any one of Examples 46 to 55 or some other examples described herein, that may further comprise reselecting a second set of one or more bits in the IP header field of the packet; and restarting modifying a bit value of each bit in the second set of bits.

Example 57 may include a method that may comprise receiving one or more data packets from a PDN gateway, wherein a data packet in the one or more packets to comprise a selected bit to have a marked bit value; identifying a bearer splitting mode for the data packet based on a mapping rule between the mode and the marked bit value of the selected bit; and performing a bearer spitting operation on the data packet based on the identified mode.

Example 58 may include the subject matter of Example 57 or some other examples described herein, that may further comprise resetting the selected bits to a default value in response to completing the bearer splitting operation.

Example 59 may include the subject matter of Examples 57 or 58 or some other examples described herein, that may further comprise receiving a message from the PDN gateway to determine one or more candidates for the selected bit, wherein the one or more candidates are from one or more of ToS field, TTL field or DSCP field of the packet.

Example 60 may include the subject matter of any one of Examples 57 to 59 or some other examples described herein, that may further comprise sending a message to the PDN gateway to indicate one or more candidate bits for the selected bit.

Example 61 may include the subject matter of any one of Examples 57 to 60 or some other examples described herein, that may further comprise receiving a message from the PDN gateway to comprise the selected bit, a default value of the selected bit, and the mapping rule.

Example 62 may include the subject matter of any one of Examples 57 to 61 or some other examples described herein, that may further comprise receiving from PDN gateway a message to notify that the marking has stopped, wherein the message to comprise a sequence number of a last marked packet in the one or more packets.

Example 63 may include the subject matter of any one of Examples 57 to 62 or some other examples described herein, that may further comprise reselecting one or more candidate bits for the selected bit of the packet indicated in a marking stop notification message from the PDN gateway.

Example 64 may include the subject matter of any one of Examples 57 to 63 or some other examples described herein, that may further comprise stopping resetting the selected bit of the packet based on a sequence number in a marking stop notification message from the PDN gateway, wherein the marking stop notification message to indicate a marking to the packet is stopped.

Example 65 may include the subject matter of any one of Examples 57 to 64 or some other examples described herein, that may further comprise identifying the bearer splitting mode from a marked bit value of the selected bit based on information relating to the mapping rule in a confirmation message to the UE.

Example 66 may include the subject matter of any one of Examples 57 to 65 or some other examples described herein, that may further comprise resetting the selected bit to a default value in response to completing a reordering of the data packet based on the bearer splitting mode.

Example 67 may include the subject matter of any one of Examples 57 to 66 or some other examples described herein, that may further comprise resetting the selected bit to a default value to obtain the packet with the default value.

Example 68 may comprise a PDN gateway, comprising a receiver to receive one or more packets; a controller to select a bit in an IP header of a packet in the one or more data packets and mark the selected bit, wherein the selected bit to have a bit value to indicate a mode for bearer splitting; and a transmitter to transmit the modified data packet to the UE.

Example 69 may include the subject matter of Example 68 or some other examples described herein, wherein the controller may send a message to the UE to request for one or more candidates for the selected bits.

Example 70 may include the subject matter of any one of Examples 68 or 69 or some other examples described herein, wherein the controller may select the bit based on a message from the UE that indicates the one or more candidates for the selected bit.

Example 71 may include the subject matter of any one of Examples 68 to 70 or some other examples described herein, wherein the controller may confirm the selected bit and a mapping rule between the bit value of the bit and the mode.

Example 72 may include the subject matter of any one of Examples 68 to 71 or some other examples described herein, wherein the controller may modify a default value of the selected bit to the bit value to mark the selected bit.

Example 73 may include the subject matter of any one of Examples 68 to 72 or some other examples described herein, wherein the controller may monitor the one or more packets in response to initiating the selected bit marking; and stop marking the selected bit in response to determining that a default value of the packet in the one or more packets has changed.

Example 74 may include the subject matter of any one of Examples 68 to 73 or some other examples described herein, wherein the controller may stop marking the selected bit in response to detecting a default value of the packet has changed; and send a message to notify the UE that marking the selected bit has stopped and the message to comprise a sequence number of a last marked packet in the one or more packets.

Example 75 may include the subject matter of any one of Examples 68 to 74 or some other examples described herein, wherein the selected bit is in a Type of Service (ToS) field, a Time to Live (TTL) field or a differentiate service code point (DSCP) field in the IP header.

Example 76 includes a wireless communication system including a UE of any one of Examples 18 to 35.

Example 77 includes a core network (CN) comprising a PDN gateway of any one of Examples 68 to 75.

Example 78 includes a radio access network (RAN) comprising a base station of any one of Examples 1 to 17.

Example 79 includes a machine-readable media having instructions, stored thereon, that when executed cause a UE to implement a method of any one of the Examples 46 to 75.

Example 80 includes a product including one or more computer-readable media having instructions, stored thereon, that when executed cause a base station to implement a method of any one of the Examples 46 to 75

Example 81 includes a product including one or more computer-readable medium having instructions, stored thereon, that when executed cause a PDN gateway to implement a method of one or more of the Examples 46 to 75.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

It should be understood that many of the functional units described in this specification have been labeled as modules or units, in order to more particularly emphasize their implementation independence. For example, a module or unit may be implemented as a hardware circuit comprising custom VLSI circuits or gate arrays, off-the-shelf semiconductors such as logic chips, transistors, or other discrete components. A module or unit may also be implemented in programmable hardware devices such as field programmable gate arrays, programmable array logic, programmable logic devices or the like.

Modules or units may also be implemented in software for execution by various types of processors. An identified module or unit of executable code may, for instance, comprise one or more physical or logical blocks of computer instructions, which may, for instance, be organized as an object, procedure, or function. Nevertheless, the executable code of an identified module or unit need not be physically located together, but may comprise disparate instructions stored in different locations which, when joined logically together, comprise the module or unit and achieve the stated purpose for the module or unit.

A module or unit of executable code may be a single instruction, or many instructions, and may even be distributed over several different code segments, among different programs, and across several memory devices. Similarly, operational data may be identified and illustrated herein within modules or units, and may be embodied in any suitable form and organized within any suitable type of data structure. The operational data may be collected as a single data set, or may be distributed over different locations including over different storage devices, and may exist, at least partially, merely as electronic signals on a system or network. The modules or units may be passive or active, including agents operable to perform desired functions.

Reference throughout this specification to "an example" means that a particular feature, structure, or characteristic described in connection with the example is included in at least one embodiment of the present disclosure. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as an equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of search spaces, to provide a thorough understanding of embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation may be made without the exercise of inventive faculty, and without departing from the principles and concepts of the disclosure. Accordingly, it is not intended that the disclosure be limited, except as by the claims set forth below.

While the methods of FIGS. 6 and 7 is illustrated to comprise a sequence of processes, the methods in some embodiments may perform illustrated processes in a different order.

While certain features of the disclosure have been described with reference to embodiments, the description is not intended to be construed in a limiting sense. Various modifications of the embodiments, as well as other embodiments of the disclosure, which are apparent to persons skilled in the art to which the disclosure pertains are deemed to lie within the spirit and scope of the disclosure.

What is claimed is:

1. A network equipment (NE), comprising:
   a selection controller to select one or more bits in an internet protocol (IP) header of a first downlink data packet, or one or more bit values for the one or more selected bits of the first downlink data packet, or a downlink mapping rule between the one or more selected bit values and a downlink bearer splitting mode of the first downlink data packet, wherein a bit of the one or more selected bits has a default value to indicate a bearer, different bits of the one or more selected bits are used to indicate different bearers, and the downlink bearer splitting mode is to indicate whether the first downlink data packet is subject to bearer splitting;
   a downlink marking controller to mark the one or more selected bits of the first downlink data packet to have the one or more selected bit values based on the downlink mapping rule and the downlink bearer splitting mode of the first downlink data packet; and to send a notification message to notify that the NE has stopped marking the one or more selected bit of the first downlink data packet, wherein the notification message comprises a sequence number of a last marked data packet in one or more downlink data packets from the NE; and
   an uplink bearer splitting controller to identify an uplink bearer splitting mode from one or more marked bit values of one or more selected bits in a first uplink data packet from a user equipment (UE) based on an uplink mapping rule between the uplink bear splitting mode and the one or more marked bit values, wherein the uplink bearer splitting mode is to indicate whether the first uplink data packet is subject to bearer splitting.

2. The NE of claim 1, wherein the selection controller is further to:
   confirm one of more of the one or more selected bits in the first downlink data packet, the downlink mapping rule between the selected bit value of each selected bit, and the selected downlink bearer splitting mode.

3. The NE of claim 1, wherein the uplink bearer splitting controller is further to:
   monitor a default value of each selected bit in the first uplink data packet to determine if the default value has changed.

4. The NE of claim 1, wherein the downlink marking controller is further to:
   modify a default value of each selected bit of the first downlink data packet with a selected bit value to mark each selected bit of the first downlink data packet.

5. The NE of claim 1, wherein the downlink marking controller is to stop marking one or more selected bits in the first downlink data packet in response to determining that a default value of a bit in the one or more selected bits of the first downlink data packet has changed.

6. A user equipment (UE), comprising:
   a selection controller to select one or more bits in an internet protocol (IP) header of a first uplink data packet, or one or more bit values for the one or more selected bits, or an uplink mapping rule between the one or more selected bit values and an uplink bearer splitting mode of the first uplink data packet, wherein a bit of the one or more selected bits has a default value to indicate a bearer, different bits of the one or more selected bits are used to indicate different bearers, and the uplink bearer splitting mode is to indicate whether the first uplink data packet is subject to bearer splitting;
   an uplink marking controller to mark the one or more selected bits in the first uplink data packet to have the one or more selected bit values based on the uplink mapping rule to indicate the uplink bearer splitting mode of the first uplink data packet; and
   a downlink bearer splitting controller to:
      identify a downlink bearer splitting mode based on a downlink mapping rule between the downlink bearer splitting mode and one or more marked bit values of one or more selected bits in a first downlink data packet from a network equipment (NE), wherein the downlink bearer splitting mode is to indicate whether the first downlink data packet is subject to bearer splitting; and
      obtain from the NE a notification message to notify that the NE has stopped marking the one or more selected bit of the first downlink data packet, wherein the notification message comprises a sequence number of a last marked data packet in one or more downlink data packets from the NE.

7. The UE of claim 6, wherein the downlink bearer splitting controller is further to:
   perform a reordering operation on one or more second downlink data packets from the NE based on the identified downlink bearer splitting mode and sequence numbers of one or more second uplink data packets.

8. The UE of claim 6, wherein the downlink bearer splitting controller is further to:
   reset the one or more selected bits in the first downlink data packet to one or more default values in response to completing a downlink bearer splitting operation.

9. The UE of claim 6, wherein the selection controller is further to:
   obtain from the NE a request message to determine one or more candidates for the one or more selected bits of the first uplink data packet to be marked.

10. The UE of claim 6, wherein one or more candidates are to comprise one or more of a Type of Service (ToS) field, a Time to Live (TTL) field, or a differentiate service code point (DSCP) field, e.g., in the header of the uplink data packet.

11. The UE of claim 6, wherein the selection controller is further to:
    provide to the NE response message to indicate one or more candidates for the one or more selected bits to be marked.

12. The UE of claim 6, wherein the selection controller is further to:
    obtain a confirmation message from the NE to comprise the one or more selected bits, one or more default values of the one or more selected bits of the first downlink data packet, and/or the downlink mapping rule.

13. The UE of claim 6, wherein the selection controller is further to:
    reselect one or more candidate bits for the one or more selected bits of the first downlink data packet based on an indication in a marking stop notification message, wherein the marking stop notification message is to indicate that a marking for the first downlink data packet is stopped relating to a change in a default value of the one or more selected bits of the first downlink data packet.

14. The UE of claim 6, wherein the downlink bearer splitting controller is further to:

stop resetting the one or more selected bits of the first downlink data packet based on a sequence number in a marking stop notification message from the NE, wherein the marking stop notification message to indicate a marking to the data packet is stopped.

15. The UE of claim 6, wherein the downlink bearer splitting controller is further to:
identify the downlink bearer splitting mode from one or more marked bit values of the one or more selected bits based on information relating to the downlink mapping rule in a confirmation message to the UE.

16. A packet data network (PDN) gateway, comprising:
a receiver to receive one or more data packets;
a controller to select a bit of one or more bits in an IP header of a packet in the one or more data packets and mark the selected bit, wherein the marked selected bit is to have a bit value to indicate a bearer based on a mode for bearer splitting, a bit of the one or more selected bits has a default value to indicate a bearer, different bits of the one or more bits are used to indicate different bearers, and the bearer splitting mode of the one or more data packets is to indicate whether the one or more data packets is subject to bearer splitting; and
sending a notification message to notify that the PDN has stopped marking the one or more selected bit of the one or more data packets, wherein the notification message comprises a sequence number of a last marked data packet in one or more data packets from the PDN; and
a transmitter to transmit the modified data packet to a user equipment (UE).

17. The PDN gateway of claim 16, wherein the controller sends a message to the UE to request for one or more candidates for the selected bits.

18. The PDN gateway of claim 16, wherein the controller selects the bit based on a message from the UE that indicates one or more candidates for the selected bit.

19. The PDN gateway of claim 16, wherein the controller confirms the selected bit and a mapping rule between the bit value of the bit and the mode.

* * * * *